United States Patent
Hondo et al.

(10) Patent No.: US 11,390,719 B2
(45) Date of Patent: Jul. 19, 2022

(54) SHEET MOLDING COMPOUND, PREPREG, AND FIBER-REINFORCED COMPOSITE MATERIAL

(71) Applicant: Toray Industries, Inc., Tokyo (JP)

(72) Inventors: Kazunori Hondo, Nagoya (JP); Norikazu Ishikawa, Nagoya (JP); Masanori Hirano, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 270 days.

(21) Appl. No.: 16/631,306

(22) PCT Filed: Jul. 25, 2018

(86) PCT No.: PCT/JP2018/027864
§ 371 (c)(1),
(2) Date: Jan. 15, 2020

(87) PCT Pub. No.: WO2019/026724
PCT Pub. Date: Feb. 7, 2019

(65) Prior Publication Data
US 2020/0207936 A1    Jul. 2, 2020

(30) Foreign Application Priority Data

Jul. 31, 2017  (JP) .............................. JP2017-147503
Oct. 6, 2017   (JP) .............................. JP2017-195708
Mar. 29, 2018  (JP) .............................. JP2018-064033

(51) Int. Cl.
*C08J 5/24*   (2006.01)
*B29B 15/10*  (2006.01)
(Continued)

(52) U.S. Cl.
CPC .................. *C08J 5/24* (2013.01); *B29B 15/10* (2013.01); *B29C 70/50* (2013.01); *C08L 63/00* (2013.01);
(Continued)

(58) Field of Classification Search
None
See application file for complete search history.

(56) References Cited

U.S. PATENT DOCUMENTS 11,208,535 B2 *  12/2021  Ochi ..................... B29C 70/06
2010/0178495 A1   7/2010  Taketa et al.
(Continued)

FOREIGN PATENT DOCUMENTS

JP   58-191723    11/1983
JP   02-235919     9/1990
(Continued)

*Primary Examiner* — Megan McCulley
(74) *Attorney, Agent, or Firm* — DLA Piper LLP (US)

(57) ABSTRACT

A sheet molding compound includes an epoxy resin composition meeting (I) and/or (II): (I) a component has a hydroxy group equivalent weight of 20 to 120, and (II) carbon fibers are bundle-shaped aggregates of discontinuous carbon fibers such that in a plane that has a largest width perpendicular to an alignment direction of the carbon fibers, two acute angles, referred to as angle a and angle b, formed between the alignment direction of the carbon fibers and sides formed by arrays of both ends of the carbon fibers in the bundle-shaped aggregates are 2° or more and 30° or less, the epoxy resin composition has a viscosity at 30° C. of $3.0 \times 10^4$ Pa·s or more and $1.0 \times 10^6$ Pa·s or less, and the epoxy resin composition has a viscosity at 120° C. of $1.0 \times 10^2$ Pa·s or more and $5.0 \times 10^3$ Pa·s or less.

15 Claims, 1 Drawing Sheet

(51) Int. Cl.
  *B29C 70/50*   (2006.01)
  *C08L 63/00*   (2006.01)
  *B29K 63/00*   (2006.01)
  *B29K 307/04*   (2006.01)

(52) U.S. Cl.
  CPC ...... *B29K 2063/00* (2013.01); *B29K 2307/04* (2013.01); *C08J 2363/00* (2013.01); *C08J 2475/04* (2013.01); *C08L 2205/06* (2013.01)

(56) References Cited

U.S. PATENT DOCUMENTS

2010/0187715 A1* 7/2010 Degen ........................ C08J 5/24
  528/405
2012/0328858 A1* 12/2012 Fujiwara ................... B32B 5/28
  156/60
2015/0218375 A1 8/2015 Hupka et al.
2016/0002496 A1 1/2016 Aou et al.
2018/0291165 A1* 10/2018 Okamoto ................ B32B 37/14
2020/0024414 A1* 1/2020 Ichino ...................... C08J 5/042
2020/0277461 A1* 9/2020 Ochi .......................... C08J 5/24
2021/0198414 A1* 7/2021 Ishikawa ................. C08G 18/58

FOREIGN PATENT DOCUMENTS

| JP | 04-088011 | 3/1992 |
| JP | 05-320303 | 12/1993 |
| JP | 2015-525828 | 9/2015 |
| JP | 2016-521298 | 7/2016 |
| WO | 2008/149615 | 12/2008 |

* cited by examiner

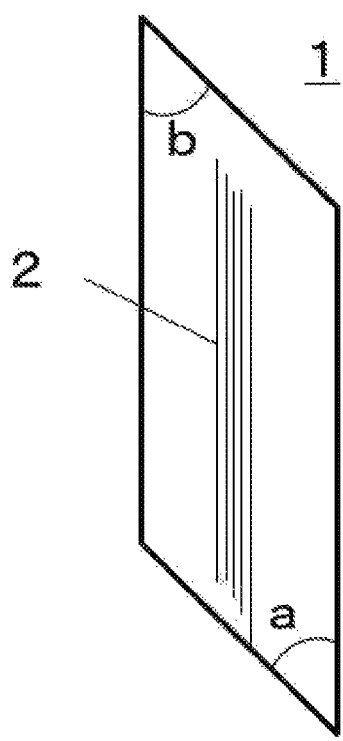

SHEET MOLDING COMPOUND, PREPREG, AND FIBER-REINFORCED COMPOSITE MATERIAL

TECHNICAL FIELD

This disclosure relates to a sheet molding compound and a prepreg for fiber reinforced composite materials that serve suitably for producing fiber reinforced composite materials for aerospace/spacecraft members and automobile members, and also relates to a fiber reinforced composite material that is produced therefrom.

BACKGROUND

Fiber reinforced composite materials formed from reinforcing fibers and matrix resins have been in wider use in such areas as aerospace industry, automobile industry, sporting goods manufacturing, and other general industries since they can be designed in a variety of material forms by taking advantage of good features of the reinforcing fibers and matrix resins, and there are a variety of production methods such as the hand layup process, filament winding process, pultrusion process, resin transfer molding (RTM) process, prepreg autoclave method, and prepreg or sheet molding compound pressing process. The term "sheet molding compound" will be occasionally abbreviated as SMC.

Of those methods, processes that use a hot press machine to mold a SMC, which is an intermediate base material composed mainly of a matrix resin and discontinuous reinforcing fibers, are attracting attention in recent years because of their high versatility and productivity.

The SMC is an intermediate base material containing discontinuous reinforcing fibers (commonly having fiber lengths of about 5 to 100 mm) and, though inferior to prepregs in terms of mechanical properties, it can expand largely in the mold when subjected to a press molding process to conform closely to a complicated shape while being molded.

Glass fiber, aramid fiber, carbon fiber, boron fiber and the like, are generally used as reinforcing fibers for SMCs, whereas thermosetting resins such as epoxy resins, unsaturated polyester resins, vinyl ester resins, phenol resins and the like, are used as matrix resin. In particular, SMCs composed mainly of a combination of carbon resin and epoxy resin, which can develop a high mechanical performance, are currently attracting attention as a new material to serve for producing lightweight aircraft and automobiles that are in greater demands in these years.

The matrix resins used in SMCs have to be low in viscosity to achieve complete impregnation of reinforcing fibers. After conversion into the B stage, on the other hand, the SMC should allow the films attached to both of its surfaces to be removed easily and at the same time should have flow properties that permit the formation of good moldings. In using carbon fiber or other fibers that are smaller in fiber diameter than glass fiber, interfiber friction resistance can occur frequently during the press molding step to cause a decrease in the flowability of the SMC, leading to the problem with the SMC failing to expand in the mold.

Thus, an epoxy resin composition containing a propylene glycol having two hydroxy groups in one molecule and a diphenyl-4,4-diisocyanate having two isocyanate groups in one molecule has been disclosed for assumed use in glass fiber based SMCs, and a method to permit easy conversion into the B stage has been proposed (Japanese Unexamined Patent Publication (Kokai) No. SHO-58-191723). In addition, an epoxy resin composition containing a solid bisphenol A type epoxy having two or more hydroxy groups in one molecule and an aliphatic isocyanate having a heterocyclic ring and containing three isocyanate groups in one molecule has been disclosed and a method that is highly heat resistant and serves for easy conversion into the B stage has been proposed (Japanese Unexamined Patent Publication (Kokai) No. HEI-2-235919). Furthermore, epoxy resin composition composed mainly of an epoxy resin containing sorbitol polyglycidyl ether having 2.4 hydroxy groups in one molecule and diphenyl-4,4-diisocyanate having three or more isocyanate groups in one molecule has also been disclosed (Japanese Unexamined Patent Publication (Kokai) No. HEI-5-320303). In addition, there are studies that investigate the shape of bundle-shaped aggregates of discontinuous carbon fibers and propose, for example, a method that realizes improved homogeneity of bundle-shaped aggregates and resins and improved flow properties by arranging the ends of the bundle-shaped aggregates and the alignment direction of the carbon fibers with an angle of 12° formed between them (International Publication WO 2008/149615).

Although being helpful for easy conversion into the B stage, the method described in Japanese Unexamined Patent Publication (Kokai) No. SHO-58-191723 has the problem of low viscosity near the molding temperature and, when it is applied to press molding of a carbon fiber based SMC, in particular, only the resin tends to expand first whereas the carbon fiber fails to flow sufficiently.

The methods described in Japanese Unexamined Patent Publication (Kokai) No. HEI-2-235919 and Japanese Unexamined Patent Publication (Kokai) No. HEI-5-320303 are disadvantageous in that the compounds containing hydroxy groups are a solid or a highly viscous liquid and accordingly cannot impregnate the fibers sufficiently, resulting in SMCs with low flexibility.

The method described in International Publication WO 2008/149615 is advantageous in that a SMC composed mainly of bundle-shaped aggregates and a vinyl ester resin arranged so that the ends of the bundle-shaped aggregates of discontinuous carbon fibers and the alignment direction of the carbon fibers make an angle of 12° to each other is press-molded to allow the bundle-shaped aggregates and resin to have a high homogeneity so that the carbon fibers and resin can flow in an integrated way, but surface irregularities can occur due to sink marks on the resin, possibly leading to an unsatisfactory surface quality. After conversion into the B stage, furthermore, the SMC at 30° C. normal temperature can become sticky due to low resin viscosity, and the films attached to both surfaces of the SMC are difficult to remove, possibly having an adverse influence on the handleability.

Thus, there is a need to eliminate these defects of the conventional technology to provide a SMC containing a resin composition that has high impregnation performance and can be easily converted into the B stage and showing good flow properties after conversion into the B stage and also provide a carbon fiber reinforced composite material having high heat resistance and good strength properties that is produced by curing the SMC. Thus, there is a need to eliminate these defects of the conventional technology to provide a SMC sufficiently high in resin viscosity after conversion into the B stage and high in handleability at 30° C. normal temperature to show good flow properties and also provide a carbon fiber reinforced composite material having high heat resistance, high surface quality, and good strength properties that is produced by curing the SMC.

Compared to this, the prepreg, which contains continuous reinforcing fibers and has a high fiber content, is an intermediate material serving to form a molded product having a high dynamic performance, and in these years, it is applied more frequently to press-molding with the aim of achieving an improved productivity. In application of an excessive press pressure or generation of irregularities, however, there will occur problems such as large flowing of the resin that is more than necessary and causes an uneven distribution of fiber weight content, a decrease in the uniformity of fiber arrangement or orientation, and deterioration in surface quality or mechanical properties.

Thus, there is a need to eliminate these defects of the conventional technology to provide a prepreg containing a resin composition that has high impregnation performance and can be easily converted into the B stage and suffering little resin flow after conversion into the B stage and also provide a carbon fiber reinforced composite material having high surface quality that is produced by curing the prepreg.

SUMMARY

We thus provide:

A SMC contains an epoxy resin composition having the components (A) to (D) (occasionally referred to as epoxy resin composition) blended with carbon fiber and meets (I) and/or (II):

component (A): an epoxy resin,
component (B): a curing agent,
component (C): a polyisocyanate compound, and
component (D): a polyol compound.

(I)
component (D) has a hydroxy group equivalent weight of 20 or more and 120 or less and meets either or both of 1 and 2:

1. component (C) contains a compound having 3 or more and 6 or less isocyanate groups in one molecule, and
2. component (D) contains a compound having 3 or more and 6 or less hydroxy groups in one molecule, (II)
the carbon fiber is in the form of bundle-shaped aggregates of discontinuous carbon fibers, the bundle-shaped aggregates are such that in the plane that has the largest width perpendicular to the alignment direction of the carbon fibers, the two acute angles, referred to as angle a and angle b, formed between the alignment direction of the carbon fibers and the sides formed by the arrays of both ends of the carbon fibers in the bundle-shaped aggregates are 2° or more and 30° or less, the epoxy resin composition has a viscosity at 30° C. of $3.0 \times 10^4$ Pa·s or more and $1.0 \times 10^6$ Pa·s or less, and the epoxy resin composition has a viscosity at 120° C. of $1.0 \times 10^2$ Pa·s or more and $5.0 \times 10^3$ Pa·s or less. The present invention also provides a fiber reinforced composite material produced by curing the SMC.

Further, the prepreg contains an epoxy resin composition having the components (A) to (D) impregnated into reinforcing fiber, and the component (D) has a hydroxy group equivalent weight of 20 or more and 120 or less:

component (A): an epoxy resin,
component (B): a curing agent,
component (C): a polyisocyanate compound, and
component (D): a polyol compound.

We also provide a fiber reinforced composite material produced by curing the prepreg.

An example that meets SMC (I) can provide a SMC showing good flow properties and also provide a carbon fiber reinforced composite material having high heat resistance and good strength properties produced by curing the SMC. An example that meets SMC (II) can provide a SMC having high handleability and good flow properties at 30° C. normal temperature and also provide a carbon fiber reinforced composite material having high heat resistance, high surface quality, and good strength properties that is produced by curing the SMC. In addition, the prepreg according to the present invention can provide a prepreg that is low in resin flowability and also provide a fiber reinforced composite material having high surface quality that is produced by curing the SMC.

BRIEF DESCRIPTION OF THE DRAWING

The FIGURE is a schematic diagram of bundle-shaped aggregates, and shows the two acute angles, referred to as angle a and angle b, formed between the alignment direction of the carbon fibers and the sides formed by the arrays of both ends of the carbon fibers in bundle-shaped aggregates.

EXPLANATION OF NUMERALS 1 bundle-shaped aggregates
2 carbon fiber
a angle a
b angle b

DETAILED DESCRIPTION

Preferred examples are described below.

First, the SMC is described.

The SMC contains an epoxy resin composition having components (A) to (D) described below blended with carbon fibers and meets (I) and/or (II):

component (A): an epoxy resin,
component (B): a curing agent,
component (C): a polyisocyanate compound, and
component (D): a polyol compound.

(I)
component (D) has a hydroxy group equivalent weight of 20 or more and 120 or less and meets either or both of 1 and 2:

1. component (C) contains a compound having 3 or more and 6 or less isocyanate groups in one molecule, and
2. component (D) contains a compound having 3 or more and 6 or less hydroxy groups in one molecule, (II)
the carbon fiber is in the form of bundle-shaped aggregates of discontinuous carbon fibers, the bundle-shaped aggregates are such that in the plane that has the largest width perpendicular to the alignment direction of the carbon fibers, the two acute angles, referred to as angle a and angle b, formed between the alignment direction of the carbon fibers and the sides formed by the arrays of both ends of the carbon fibers in the bundle-shaped aggregates are 2° or more and 30° or less, the epoxy resin composition has a viscosity at 30° C. of $3.0 \times 10^4$ Pa·s or more and $1.0 \times 10^6$ Pa·s or less, and the epoxy resin composition has a viscosity at 120° C. of $1.0 \times 10^2$ Pa·s or more and $5.0 \times 10^3$ Pa·s or less.

An example meeting the SMC (I) provides a SMC containing an epoxy resin composition having components (A) to (D) blended with carbon fibers, in which component (D) has a hydroxy group equivalent weight of 20 or more and 120 or less, and meets either or both of 1 and 2 to realize high level flow properties that cannot be achieved by the generally known conventional combination of an isocyanate compound and a polyol compound.

1. component (C) contains a compound having 3 or more and 6 or less isocyanate groups in one molecule, and 2. component (D) contains a compound having 3 or more and 6 or less hydroxy groups in one molecule.

For an example meeting SMC (I), component (A) is essential to develop high heat resistance and mechanical properties. The epoxy resin of component (A) means a compound that has one or more epoxy groups in one molecule.

There are no specific limitations on the epoxy resin of component (A) as long as it is a compound having one or more epoxy groups in one molecule. Examples of bifunctional epoxy resins include bisphenol A type epoxy resin, bisphenol F type epoxy resin, bisphenol S type epoxy resin, biphenyl type epoxy resin, dicyclopentadiene type epoxy resin, and modified epoxy resins thereof. Examples of tri- or higher functional polyfunctional epoxy resins include, but not limited to, novolac type epoxy resins such as phenol novolac type epoxy resin and cresol novolac type epoxy resin; glycidyl amine type epoxy resins such as tetraglycidyl diaminodiphenyl methane, triglycidyl aminophenol type epoxy resin, and tetraglycidyl amine type epoxy resin; glycidyl ether type epoxy resins such as tetrakis(glycidyloxyphenyl) ethane and tris(glycidyloxy methane), modified epoxy resins thereof, and brominated epoxy resins produced through bromination of these epoxy resins. A combination of a plurality of these epoxy resins may be used as component (A). In particular, bisphenol A type epoxy resin, bisphenol F type epoxy resin, bisphenol S type epoxy resin, phenol novolac type epoxy resin, and cresol novolac type epoxy resin can be used suitably, of which bisphenol type epoxy resins such as bisphenol A type epoxy resin, bisphenol F type epoxy resin, and bisphenol S type epoxy resin are particularly suitable. The use of these epoxy resins has the additional effect of providing a fiber reinforced composite material having improved mechanical strength compared to, for example, the use of highly rigid epoxy resins such as those having naphthalene backbones in their molecules. This is because, whereas highly rigid epoxy resins tend to suffer from strain when cured in a short time, which causes an increase in crosslink density such problems are unlikely to occur easily when the above epoxy resins are used.

Commercial products of bisphenol A type epoxy resin include jER (registered trademark) 825, jER (registered trademark) 826, jER (registered trademark) 827, jER (registered trademark) 828, jER (registered trademark) 834, jER (registered trademark) 1001, jER (registered trademark) 1002, jER (registered trademark) 1003, jER (registered trademark) 1004, jER (registered trademark) 1004 AF, jER (registered trademark) 1007, jER (registered trademark) 1009 (all manufactured by Mitsubishi Chemical Corporation), Epicron (registered trademark) 850 (manufactured by DIC Corporation), Epotohto (registered trademark) YD-128 (manufactured by Nippon Steel & Sumikin Chemical Co., Ltd.), DER (registered trademark)-331, and DER (registered trademark)-332 (both manufactured by The Dow Chemical Company).

Commercial products of bisphenol F type epoxy resin include jER (registered trademark) 806, jER (registered trademark) 807, jER (registered trademark) 1750, jER (registered trademark) 4004P, jER (registered trademark) 4007P, jER (registered trademark) 4009P (all manufactured by Mitsubishi Chemical Corporation), Epicron (registered trademark) 830 (manufactured by DIC Corporation), Epotohto (registered trademark) YDF-170, Epotohto (registered trademark) YDF2001, and Epotohto (registered trademark) YDF2004 (all manufactured by Nippon Steel & Sumikin Chemical Co., Ltd.). Commercially available products of tetramethyl bisphenol F type epoxy resin, which is an alkyl substitution product, include Epotohto (registered trademark) YSLV-80XY (manufactured by Nippon Steel & Sumikin Chemical Co., Ltd.).

Commercially available products of bisphenol S type epoxy resin include Epicron (registered trademark) EXA-1515 (manufactured by DIC Corporation).

Commercially available products of phenol novolac type epoxy resin include jER (registered trademark) 152, jER (registered trademark) 154 (both manufactured by Mitsubishi Chemical Corporation), Epicron (registered trademark) N-740, Epicron (registered trademark) N-770, and Epicron (registered trademark) N-775 (all manufactured by DIC Corporation).

Commercial products of cresol novolac type epoxy resin include Epicron (registered trademark) N-660, Epicron (registered trademark) N-665, Epicron (registered trademark) N-670, Epicron (registered trademark) N-673, and Epicron (registered trademark) N-695 (all manufactured by DIC), and EOCN-1020, EOCN-102S, and EOCN-104S (all manufactured by Nippon Kayaku Co., Ltd.).

The use of an aliphatic epoxy resin as reactive diluent is preferred because it can work to decrease the viscosity of the epoxy resin composition to achieve efficient impregnation of the carbon fiber. In particular, the use of a bi- or higher functional aliphatic epoxy resin is preferred because it can work to decrease the viscosity of the epoxy resin composition while avoiding the formation of a fiber reinforced composite material having largely deteriorated bending properties. Either or both of a monofunctional and a bi- or higher functional aliphatic epoxy resin may be used. To achieve an adequately large decrease in the viscosity of the epoxy resin composition, it is preferable for the aliphatic epoxy resin to have a viscosity at 25° C. of 200 mPa·s or less, more preferably 150 mPa·s or less.

It is preferable for the bi- or higher functional aliphatic epoxy resin to be a polyglycidyl ether of a di- or higher valent aliphatic alcohol which may have an alicyclic backbone, and more preferably a polyglycidyl ether of a di- or higher valent aliphatic alcohol containing 4 to 10 carbon atoms in which hydroxy groups are bonded to linear or branched hydrocarbon groups and which may have an alicyclic backbone.

Examples of the di- or higher valent aliphatic alcohol include 1,4-butanediol, 3-methyl-1,5-pentanediol, diethylene glycol, neopentyl glycol, 1,6-hexanediol, 1,9-nonanediol, cyclohexanedimethanol, propylene glycol, glycerin, and trimethylolpropane.

It is preferable for the monofunctional component (A) to be a glycidyl ether of a monovalent aliphatic alcohol which may have an alicyclic backbone, and more preferably a glycidyl ether of a monovalent aliphatic alcohol containing 4 to 12 carbon atoms in which hydroxy groups are bonded to linear or branched hydrocarbon groups and which may have an alicyclic backbone.

Examples of the monovalent aliphatic alcohol include butyl alcohol, isobutyl alcohol, s-butyl alcohol, 2-ethyl hexanol, stearyl alcohol, isostearyl alcohol, and lauryl alcohol.

Each of these aliphatic epoxy resins may be used singly or two or more thereof may be used in combination.

It is preferable for the aliphatic epoxy resins to account for 1 to 20 parts by mass relative to the total quantity, which accounts for 100 parts by mass, of component (A). An aliphatic epoxy resin content of 1 part by mass or more relative to the total quantity, which accounts for 100 parts by mass, of component (A), is preferred because it can work to achieve a sufficiently large decrease in the viscosity of the epoxy resin composition and enhance the impregnation of the carbon fibers, whereas a content of 20 parts by mass or less is preferred because it serves to avoid the formation of a fiber reinforced composite material having largely deteriorated heat resistance. From such a point of view, the content is more preferably 5 to 15 parts by mass.

There are no specific limitations on component (B) as long as it can cure the epoxy resin, and good examples include amine based compounds, phenolic compounds, anhydride based compounds, mercaptan based compounds, various imidazoles, tertiary amines, organic phosphorus compounds, urea compounds, ammonium salts, and sulfonium salts. Examples of the amine based curing agents include dicyandiamide, aromatic polyamine, aliphatic amine, aminobenzoic acid esters, thiourea-added amine, and hydrazide. Examples of the phenolic curing agents include bisphenol, phenol novolac resin, cresol novolac resin, and polyphenol compounds. Examples of the anhydride based curing agents include phthalic anhydride, maleic anhydride, succinic anhydride, and carboxylic anhydride. Examples of the mercaptan based curing agents include polymercaptan and polysulfide resin. Of the examples above, amine based curing agents are preferred. Among others, furthermore, the use of dicyandiamide or a derivative thereof is particularly preferred. Dicyandiamide is widely used as a curing agent for epoxy resins because of its excellent ability to produce cured resins having good mechanical properties and high heat resistance. Furthermore, it can be used suitably because of being high in storage stability for epoxy resin compounds. Derivatives of dicyandiamide, which are compounds formed by bonding various compounds to dicyandiamide, can serve as effectively as like dicyandiamide for providing cured resins having good mechanical properties, high heat resistance and the like, and epoxy resin compositions containing a dicyandiamide derivative as a curing agent are high in storage stability. Examples of dicyandiamide derivatives include those produced by bonding various compounds such as epoxy resin, vinyl compound, acrylic compound, and 9,10-dihydro-9-oxa-10-phosphaphenanthrene-10-oxide to dicyandiamide. Each of these may be used singly or two or more thereof may be used in combination. Or they may be used in combination with dicyandiamide. Examples of commercially available dicyandiamide products include DICY7 and DICY15 (both manufactured by Mitsubishi Chemical Corporation).

For an example that meets SMC (I), component (B) preferably accounts for 1 to 50 parts by mass relative to 100 parts by mass of component (A). If component (B) accounts for 1 parts by mass or more relative to 100 parts by mass of component (A), it is preferred because it serves effectively for improving the curing performance, whereas a content of 50 parts by mass or less is preferred because it serves to develop high heat resistance. From such a point of view, it is more preferably 1 to 20 parts by mass.

The example that meets SMC (I) meets either or both of 1 and 2:
1. component (C) contains a compound having 3 or more and 6 or less isocyanate groups in one molecule, and
2. component (D) contains a compound having 3 or more and 6 or less hydroxy groups in one molecule.

For the example that meets SMC (I), component (C) is a polyisocyanate compound. There are no specific limitations thereon as long as it has two or more isocyanate groups on the average in one molecule and generally known aliphatic isocyanates and aromatic isocyanates will be useful. To meet 1 above, component (C) contains a compound having 3 or more and 6 or less isocyanate groups in one molecule.

Aliphatic isocyanates that can be used as polyisocyanate compounds for component (C) include, for example, ethylene diisocyanate, trimethylene diisocyanate, dodecamethylene diisocyanate, hexamethylene diisocyanate, tetramethylene diisocyanate, pentamethylene diisocyanate, propylene-1,2-diisocyanate, 2,3-dimethyltetramethylene diisocyanate, butylene-1,2-diisocyanate, butylene-1,3-diisocyanate, 1,4-diisocyanate hexane, cyclopentene-1,3-diisocyanate, isophorone diisocyanate, 1,2,3,4-tetraisocyanate butane, and butane-1,2,3-triisocyanate. Aromatic isocyanates that can be used as polyisocyanate compounds for component (C) include, for example, aromatic isocyanates such as p-phenylene diisocyanate, 1-methylphenylene-2,4-diisocyanate, naphthalene-1,4-diisocyanate, tolylene diisocyanate, diphenyl-4,4-diisocyanate, benzene-1,2,4-triisocyanate, xylylene diisocyanate, diphenylmethane diisocyanate (MDI), diphenylpropane diisocyanate, tetramethylene xylene diisocyanate, and polymethylene polyphenyl polyisocyanate, as well as those having a structure containing some of these aromatic isocyanates bonded by methylene groups and the like. A prepolymer prepared by preliminary polymerization of one of these polyisocyanate compounds and a polyol compound may also be used. These polyisocyanate compounds may be used singly or as a mixture of two or more thereof.

For any isocyanate compound above, it is preferable from the viewpoint of realizing good flow properties after conversion into the B stage that the epoxy resin composition meets 1. More specifically, it preferably contains a polyisocyanate compound containing a polyisocyanate having 3 or more and 6 or less isocyanate groups in one molecule. Good examples include those containing an aromatic isocyanate such as polymethylene polyphenyl polyisocyanate or containing a structure in which such aromatic isocyanates are connected by methylene groups and the like. Also useful is a prepolymer prepared by preliminary polymerization of one of the above polyisocyanate compounds and a polyol compound.

For an example that meets SMC (I), component (C) is preferably an aromatic isocyanate compound, and more preferably a derivative of diphenyl methane diisocyanate (MDI), among others. A derivative of diphenyl methane diisocyanate (MDI) means a compound having an MDI-derived structure such as a compound having a structure in which MDI units are connected by methylene groups, a compound formed by adding a functional group such as alkyl group to a prepolymer MDI prepared by preliminary polymerization of MDI and a polyol compound, and polymethylene polyphenyl polyisocyanate. They are preferred because they can serve to produce cured resins having high heat resistance.

For an example that meets SMC (I), component (C) preferably accounts for 1 to 50 parts by mass relative to 100 parts by mass of component (A). If component (C) accounts for 1 part by mass or more relative to 100 parts by mass of component (A), it is preferable because the conversion into the B stage can progress to a sufficiently high degree to permit the formation of a fiber reinforced composite material in which carbon fibers are dispersed uniformly in a matrix resin to develop good mechanical properties, whereas a content of 50 parts by mass or less allows the SMC to expand sufficiently in the mold during the hot press molding step. From such a point of view, the content is more preferably 10 to 40 parts by mass.

For an example that meets SMC (I), it is essential for component (D) to be an alcohol compound having two or more hydroxy groups in one molecule and have a hydroxy group equivalent weight of 20 or more and 120 or less. The hydroxy group equivalent weight of an alcohol compound is calculated by dividing its molecular weight by the number of hydroxy groups in one molecule. To meet 2 above, component (D) contains a compound having 3 or more and 6 or less hydroxy groups in one molecule. Examples of the alcohol compound having two or more hydroxy groups in one molecule include aliphatic alcohol compounds, alicyclic alcohol compounds, and aromatic alcohol compounds. An aliphatic alcohol compound has only aliphatic chains in its structure. An alicyclic alcohol compound has an alicyclic backbone in its structure, and one containing both an alicyclic backbone and an aliphatic chain is also classified as an alicyclic alcohol compound. An aromatic alcohol compound has an aromatic ring in its structure, and one containing either or both of an alicyclic backbone and an aliphatic chain is also classified as an aromatic alcohol compound if it has an aromatic ring in its structure.

Of these alcohol compounds having two or more hydroxy groups in one molecule, aliphatic alcohol compounds and alicyclic alcohol compounds are preferred, and aliphatic alcohol compounds are particularly preferred. The use of an aliphatic alcohol compound or an alicyclic alcohol compound is preferred because they promote the conversion into the B stage, which involves a reaction between isocyanate groups and hydroxy groups of the alcohol compound, and the use of an aliphatic alcohol compound is particularly preferred because it is highly reactive to isocyanate groups and works to promote the conversion into the B stage.

Examples of the aliphatic alcohol compound include polyalkylene glycol. Examples of polyalkylene glycol include bifunctional ones such as ethylene glycol, propylene glycol, diethylene glycol, triethylene glycol, dipropylene glycol, and polyethylene glycol with a molecular weight of 240 or less, trifunctional ones such as glycerin, tetrafunctional ones such as diglycerol, and hexafunctional ones such as sorbitol. Examples of the alicyclic alcohol compound include cycloalkane polyol. Useful cycloalkane polyol compounds include bifunctional ones such as cyclopropanediol, cyclopentanediol, and cyclohexanediol, and trifunctional ones such as cyclopropane triol, cyclopentane triol, and cyclohexane triol. Examples of the additionally mentioned alicyclic alcohol compounds that contain both an alicyclic backbone and an aliphatic chain in one molecule include cycloalkane polyalkyl polyol. Useful cycloalkane polyalkyl polyol compounds include bifunctional ones such as cyclopropane dimethanol, cyclopentane dimethanol, cyclohexane dimethanol, and trifunctional ones such as cyclopropane trimethanol, cyclopentane trimethanol, and cyclohexane trimethanol.

Each of these may be used singly or two or more thereof may be used in combination. For an example that meets SMC (I), the use of one, among others, that meets the aforementioned 2 (component (D) contains a compound having 3 or more and 6 or less hydroxy groups in one molecule) is preferred because a resin adequately converted into the B stage can be produced using a small amount of this component.

For an example that meets SMC (I), component (D) preferably accounts for 1 to 30 parts by mass relative to 100 parts by mass of component (A). If component (D) accounts for 1 part by mass or more relative to 100 parts by mass of component (A), it is preferred because it will have a sufficiently large viscosity increasing effect, whereas a content of 30 parts by mass or less is preferred because it serves to avoid a decrease in heat resistance.

For an example that meets SMC (I), the epoxy resin composition, as described above, should meet either or both of the aforementioned 1 and 2, and good flow properties are expected after conversion into the B stage when meeting 1 whereas the addition of a small amount can serves to obtain a resin adequately converted into the B stage when meeting 2. If both component (C) and component (D) meet 1 and 2, respectively, it is preferable because the addition of a small amount will have a sufficiently large viscosity increasing effect while maintaining a required viscosity without suffering its decrease when heated.

For an example that meets SMC (I), it is preferable that in addition to the aforementioned components (A) to (D), at least one compound selected from the group consisting of quaternary ammonium salts, phosphonium salts, imidazole compounds, and phosphine compounds is contained as component (E). Examples of the quaternary ammonium salts include tetramethyl ammonium chloride, tetramethyl ammonium bromide, tetramethyl ammonium iodide, and tetrabutyl ammonium bromide. Examples of the phosphonium salts include allyltriphenyl phosphonium bromide, diallyldiphenyl phosphonium bromide, ethyltriphenyl phosphonium chloride, ethyltriphenyl phosphonium iodide, tetrabutyl phosphonium acetate, tetrabutyl phosphonium chloride, tetrabutyl phosphonium bromide, and tetrabutyl phosphonium iodide. Examples of the imidazole compounds include 2-phenyl imidazole and 2-methyl imidazole. Examples of the phosphine compounds include triphenyl phosphine. As described above, component (E) is at least one compound selected from the group consisting of quaternary ammonium salts, phosphonium salts, imidazole compounds, and phosphine compounds, and this means that a compound selected from the above ones may be used singly or two or more of them may be used in combination. Of these, the use of a quaternary ammonium salt and/or a phosphine compound as component (E) is preferable because they work to largely shorten the curing period.

For an example that meets SMC (I), component (E) preferably accounts for 1 to 15 parts by mass relative to 100 parts by mass of component (A). If component (E) accounts for 1 part by mass or more relative to 100 parts by mass of component (A), it is preferable because it serves effectively for allowing the conversion into the B stage to progress to a sufficient degree and also improving the curing performance, and the content is more preferably 2 parts by mass or more. If component (E) accounts for 15 parts by mass or less relative to 100 parts by mass of component (A), it is preferable because it will not cause a decrease in heat resistance, and the content is more preferably 10 parts by mass or less.

For an example that meets SMC (I), when the epoxy resin composition contains component (E), it is preferable that a urea compound as represented by formula (1) is also contained as component (F).

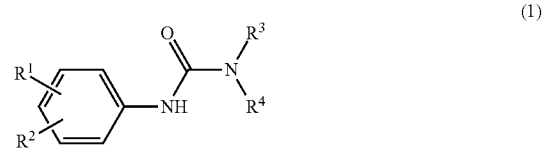

(1)

In formula (1), $R^1$ and $R^2$ are each independently H, $CH_3$, $OCH_3$, $OC_2H_5$, NO2, halogen, or $NH-CO-NR^3R^4$. $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms, and here, it is preferable for the hydrocarbon groups in $R^3$ and $R^4$ to be alkyl groups. In the hydrocarbon group, allyl group, alkoxy group, alkenyl group, aralkyl group, and alicyclic compound containing both $R^3$ and $R^4$, part of the hydrogen atoms may be replaced with substituent groups or atoms other than those listed above (for example, halogen atoms), as long as 1 to 8 carbon atoms are contained.

Urea compounds as represented by formula (1) that can be used as component (F) include, for example, 3-phenyl-1,1-dimethyl urea, 3-(3,4-dichlorophenyl)-1,1-dimethyl urea, 3-(3-chloro-4-methylphenyl)-1,1-dimethyl urea, 2,4-bis(3, 3-dimethylureido) toluene, and 4,4'-methylenebis(phenyldimethylurea), which may be used singly or as a mixture of two or more thereof. Of these, 4,4'-methylenebis(phenyldimethylurea) is the most preferable because it works to largely shorten the curing period.

For an example that meets SMC (I), when the epoxy resin composition contains component (F) in addition to component (E), component (F) preferably accounts for 1 to 15 parts by mass relative to 100 parts by mass of component (A). If component (F) accounts for 1 part by mass or more relative to 100 parts by mass of component (A), it is preferable because it serves effectively for improving the curing performance, and the content is more preferably 2 parts by mass or more and still more preferably 3.5 parts by mass or more. If component (F) accounts for 15 parts by mass or less relative to 100 parts by mass of component (A), it is preferable because it will not cause a decrease in heat resistance, and the content is more preferably 10 parts by mass or less.

For an example that meets SMC (I), the epoxy resin composition preferably has a viscosity at 70° C. of 10 mPa s or more and 1,000 mPa s or less, more preferably 10 mPa s or more and 900 mPa·s or less, as measured by a type E viscometer. An epoxy resin composition having a viscosity at 70° C. of 1,000 mPa·s or less will work efficiently to impregnate carbon fibers, thereby providing a fiber reinforced composite material having a high surface quality. An epoxy resin composition having a viscosity at 70° C. of 10 mPa·s or more will not suffer from a significantly large decrease in viscosity and the resin is prevented from flowing out without impregnating the carbon fiber, thus permitting uniform impregnation of the carbon fiber. To determine the viscosity as defined herein, all components are mixed and stirred for one minute and the resulting epoxy resin composition is subjected to measurement. The time point immediately after the end of the mixing and one-minute stirring of the components in the epoxy resin composition preparation step will be occasionally referred to as "immediately after preparation or mixing".

For an example that meets SMC (I), the heat resistance of a fiber reinforced composite material produced from an epoxy resin composition depends on the glass transition temperature of the cured epoxy resin produced by curing the epoxy resin composition. To provide a fiber reinforced composite material having high heat resistance, the cured epoxy resin produced by complete heat-curing at a temperature of 140° C. for 2 hours preferably has a glass transition temperature of 140° C. or more and 250° C. or less, more preferably 150° C. or more and 220° C. or less. If the glass transition temperature is less than 140° C., the cured epoxy resin may be likely to be low in heat resistance. If the glass transition temperature is more than 250° C., the three dimensional crosslinked structure will be so high in crosslink density that the cured epoxy resin will be brittle, possibly resulting in a fiber reinforced composite material that is low in tensile strength, impact resistance and the like. The glass transition temperature of a cured epoxy resin prepared by curing an epoxy resin composition can be determined from measurements taken by using a dynamic viscoelasticity measurement (DMA) apparatus. Specifically, a rectangular test piece cut out of a cured resin plate is subjected to DMA measurement while being heated, and the temperature at the inflection point in the resulting storage elastic modulus G' curve is determined as Tg. The measuring conditions used were as described in Examples.

An SMC that meets (I) contains an epoxy resin composition as described above and carbon fiber. For the SMC that meets (I), there are no specific limitations on the type and length of the carbon fibers or the content ratio of the carbon fibers and epoxy resin composition, but commonly it is preferable to use carbon fibers having fiber lengths of about 5 to 100 mm, average fiber diameter of 3 to 12 m, carbon fiber areal weight of 0.1 to 5 kg/m2, and carbon fiber mass content of 30% to 60%.

When selecting a carbon fiber to use, various types of carbon fibers are available for different uses, but it is preferable from the viewpoint of impact resistance to adopt a carbon fiber that has a tensile modulus not more than 400 GPa. From the viewpoint of strength, the use of carbon fibers having a tensile strength of 4.4 to 6.5 GPa is preferred because a composite material with high rigidity and high mechanical strength can be produced. Tensile elongation is also an important factor, and it is preferable to use a high-strength, high-elongation carbon fiber having a tensile elongation of 1.7% to 2.3%. The most suitable carbon fiber will have various good properties simultaneously including a tensile modulus of at least 230 GPa, tensile strength of at least 4.4 GPa, and tensile elongation of at least 1.7%.

Commercially available products of carbon fiber include Torayca (registered trademark) T800G-24K, Torayca (registered trademark) T800S-24K, Torayca (registered trademark) T700G-24K, Torayca (registered trademark) T300-3K, and Torayca (registered trademark) T700S-12K (all manufactured by Toray Industries, Inc.).

There are no specific limitations on the method to use for the production of the SMC that meets (I), but for example, the SMC that meets (I) can be produced by impregnating carbon fibers with a mixture of the components of an epoxy resin composition that meets (I) (a mixture of the components of an epoxy resin composition will be occasionally referred to simply as a resin composition) by a generally known method suited to the features of the carbon fibers, and then maintaining the temperature from room temperature to about 80° C. for a few hours to a few days so that the resin composition comes in a semicured state as the viscosity rise levels off. The treatment of an epoxy resin composition into such a semicured state where the viscosity rise of the resin composition has leveled off is referred as conversion into the B stage. To realize such conversion into the B stage, any processing conditions may be adopted in the temperature range from room temperature to about 80° C. and the time range from a few hours to a few days. In the evaluations, conversion into the B stage is realized by maintaining the resin composition at 40° C. for 24 hours so that the epoxy resin composition comes into a semicured state as the viscosity rise levels off. For the SMC that meets (I), it is considered that conversion into the B stage is realized as a result of a reaction mainly between the polyisocyanate compound and hydroxy groups in the epoxy resin, and the viscosity of the epoxy resin composition after conversion into the B stage, which is measured at the molding temperature, for example 120° C., using a DMA (ARES, manufactured by TA Instruments), is preferably $1.0\times10^2$ Pa·s or more and $1.0\times10^5$ Pa·s or less, more preferably $5.0\times10^2$ Pa·s or more and $1.0\times10^4$ Pa·s or less. The range may be between either upper limit and either lower limit. Furthermore, it is preferable for the epoxy resin composition after conversion into the B stage to undergo smaller viscosity changes in high temperature regions, and more preferably satisfies:

$$1 \leq A/B \leq 100$$

A is the viscosity at 70° C. and B is the viscosity at 130° C.

It is more preferable that the equation below is also satisfied:

$$1 \leq A/B \leq 50$$

The use of such a SMC serves to produce an intended fiber reinforced composite material.

The fiber reinforced composite material that meets (I) is produced by curing the SMC that meets (I). Commonly, when intended for use in the field of automobile production, in particular, fiber reinforced composite materials produced by curing SMCs are required to have good mechanical properties including high heat resistance and bending strength. For the fiber reinforced composite material, the epoxy resin used as matrix resin will have a glass transition temperature of 140° C. or more and 250° C. or less after being cured, even when curing is carried out at 140° C., and accordingly the good mechanical properties of the cured epoxy resin are reflected in the resulting composite material, which accordingly has a high bending strength of 250 MPa or more, or 300 MPa or more in a more preferred example, even when bending strength test is performed at 150° C.

Next, the SMC that meets (II) is described.

The SMC that meets (II) contains an epoxy resin composition having the components (A) to (D) blended with carbon fibers and meeting (II):
component (A): an epoxy resin,
component (B): a curing agent,
component (C): a polyisocyanate compound, and
component (D): a polyol compound.
(II)
the carbon fiber is in the form of bundle-shaped aggregates of discontinuous carbon fibers, the bundle-shaped aggregates are such that in the plane that has the largest width perpendicular to the alignment direction of the carbon fibers, the two acute angles, referred to as angle a and angle b, formed between the alignment direction of the carbon fibers and the sides formed by the arrays of both ends of the carbon fibers in the bundle-shaped aggregates are 2° or more and 30° or less, the carbon fiber is in the form of bundle-shaped aggregates of discontinuous carbon fibers, the bundle-shaped aggregates are such that in the plane that has the largest width perpendicular to the alignment direction of the carbon fibers, the two acute angles, referred to as angle a and angle b, formed between the alignment direction of the carbon fibers and the sides formed by the arrays of both ends of the carbon fibers in the bundle-shaped aggregates are 2° or more and 30° or less, the epoxy resin composition has a viscosity at 30° C. of $3.0\times10^4$ Pa·s or more and $1.0\times10^6$ Pa·s or less, and the epoxy resin composition has a viscosity at 120° C. of $1.0\times10^2$ Pa·s or more and $5.0\times10^3$ Pa·s or less.

Angle a and angle b in the bundle-shaped aggregates of discontinuous carbon fibers contained in the SMC that meet (II) are such angles as illustrated in the FIGURE.

When the SMC used contains carbon fibers in which both angle a and angle b are 20 or more and 30° or less and an epoxy resin composition that has components (A) to (D) and shows a viscosity of $3.0\times10^4$ Pa·s or more and $1.0\times10^6$ Pa·s or less at 30° C. and a viscosity of $1.0\times10^2$ Pa·s or more and $5.0\times10^3$ Pa·s or less at 120° C., the handleability and flow properties at 30° C. normal temperature can be improved to a level that cannot be achieved by the conventional technology and the carbon fibers and the resin has an increased homogeneity, making it possible to produce a fiber reinforced composite material that has a high surface quality as a result of high-level control of the surface irregularities due to sink marks formed during the curing of the resin and also has high strength.

Angle a and angle b, which occur between the sides formed by the arrays of both ends of the carbon fibers in the bundle-shaped aggregates and the alignment direction of the carbon fibers should be as small as possible to prepare a SMC having a high homogeneity of bundle-shaped aggregates and resin, which serves effectively to provide a molded fiber reinforced composite material having an improved surface quality and strength. This effect will be particularly noticeable when angle a and angle b are 30° or less. On the other hand, however, the handleability of the bundle-shaped aggregates deteriorates as angle a and angle b decrease. In addition, the stability in the fiber cutting step will decrease with a decreasing angle between the carbon fiber alignment direction and the cutting blade. Accordingly, it is preferable for angle a and angle b to be 2° or more. It is more preferable for angle a and angle b to be 3° or more and 25° or less. From the viewpoint of the relation between the improved surface quality and strength of the resulting fiber reinforced composite material and the processability in the bundle-shaped aggregate production step, it is still more preferable for angle a and angle b to be 5° or more and 15° or less. The angles are as illustrated in the FIGURE as described above and represented in absolute values.

For the production of bundle-shaped aggregates of discontinuous carbon fibers, useful machines for cutting continuous carbon fiber bundles include, for example, guillotine cutter, roving cutter, and other rotary cutters. The continuous carbon fiber bundles are cut after being inserted into a cutting machine in a state in which the length direction of the continuous carbon fiber bundles are at a relatively oblique angle to the cutting blade mounted in the cutting machine.

The epoxy resin composition that meets SMC (II) is an epoxy resin composition containing components (A) to (D), and the epoxy resin composition contained in the SMC has a viscosity at 30° C. of $3.0\times10^4$ Pa·s or more and $1.0\times10^6$ Pa·s or less and a viscosity at 120° C. of $1.0\times10^2$ Pa·s or more and $5.0\times10^3$ Pa·s or less.

For an example that meets SMC (II), preferred compounds, properties, contents of component (A) and component (B) of the epoxy resin composition are the same as those for the epoxy resin composition of the SMC that meets (I).

For an example that meets SMC (II), component (C) of the epoxy resin composition is a polyisocyanate compound. There are no specific limitations thereon as long as it has two or more isocyanate groups on the average in one molecule and generally known aliphatic isocyanates and aromatic isocyanates will be useful. Aliphatic isocyanates that can be used as polyisocyanate compounds for component (C) include, for example, ethylene diisocyanate, trimethylene diisocyanate, dodecamethylene diisocyanate, hexamethylene diisocyanate, tetramethylene diisocyanate, pentamethylene diisocyanate, propylene-1,2-diisocyanate, 2,3-dimethyltetramethylene diisocyanate, butylene-1,2-diisocyanate, butylene-1,3-diisocyanate, 1,4-diisocyanate hexane, cyclopentene-1,3-diisocyanate, isophorone diisocyanate, 1,2,3,4-tetraisocyanate butane, and butane-1,2,3-triisocyanate. Aromatic isocyanates that can be used as polyisocyanate compounds for component (C) include, for example, aromatic isocyanates such as p-phenylene diisocyanate, 1-methylphenylene-2,4-diisocyanate, naphthalene-1,4-diisocyanate, tolylene diisocyanate, diphenyl-4,4-diisocyanate, benzene-1,2,4-triisocyanate, xylylene diisocyanate, diphenylmethane diisocyanate (MDI), diphenylpropane diisocyanate, tetramethylene xylene diisocyanate, and polymethylene polyphenyl polyisocyanate, as well as those having a structure containing some of these aromatic isocyanates bonded by methylene groups and the like. A prepolymer prepared by preliminary polymerization of one of these polyisocyanate compounds and a polyol compound may also be used. These polyisocyanate compounds may be used singly or as a mixture of two or more thereof. For any isocyanate compound above to be used for the epoxy resin composition that meets SMC (II), it is preferable from the viewpoint of realizing good flow properties after conversion into the B stage that the epoxy resin composition to be used meets 1. More specifically, it preferably contains a polyisocyanate compound containing a polyisocyanate having 3 or more and 6 or less isocyanate groups in one molecule. Good examples include those containing an aromatic isocyanate such as polymethylene polyphenyl polyisocyanate or containing a structure in which such aromatic isocyanates are connected by methylene groups and the like. Also useful are aromatic isocyanates such as polymethylene polyphenyl isocyanate, trimers of such polyisocyanates, and prepolymers prepared by preliminary polymerization of one of these polyisocyanate compounds and a polyol compound.

For an example that meets SMC (II), component (C) of the epoxy resin composition preferably accounts for 1 to 50 parts by mass relative to 100 parts by mass of component (A). If component (C) accounts for 1 part by mass or more relative to 100 parts by mass of component (A), it is preferable because the conversion into the B stage can progress to a sufficiently high degree to permit the formation of a fiber reinforced composite material in which carbon fibers are dispersed uniformly in a matrix resin to develop good mechanical properties, whereas a content of 50 parts by mass or less allows the SMC to expand sufficiently in the mold during the hot press molding step. From such a point of view, the content is more preferably 10 to 40 parts by mass.

For an example that meets SMC (II), there are no specific limitations on component (D) of the epoxy resin composition as long as it has two or more hydroxy groups in one molecule and generally known ones will be useful. Useful polyol compounds for component (D) include, for example, dialkylene glycol, polyether polyol, polyester polyol, aromatic alcohol, and various phenols, and useful alcohols include bifunctional alcohols such as ethylene glycol, propylene glycol, diethylene glycol, triethylene glycol, dipropylene glycol, and polyethylene glycol, trifunctional alcohols such as glycerin, tetrafunctional ones such as diglycerol, and hexafunctional alcohol such as sorbitol. Also useful are derivatives thereof in which hydroxy groups are replaced with epoxy groups and the like. Each of these may be used singly or two or more thereof may be used in combination. Since a resin adequately converted into the B stage can be produced using a small amount of this component, it is preferable for them to have a hydroxy group equivalent weight of 20 or more and 120 or less. The hydroxy group equivalent weight of an alcohol compound is calculated by dividing its molecular weight by the number of hydroxy groups in one molecule. Furthermore, it is preferable for them to contain a compound having 3 or more and 6 or less hydroxy groups in one molecule.

For an example that meets SMC (II), component (D) preferably accounts for 1 to 30 parts by mass relative to 100 parts by mass of component (A). If component (D) accounts for 1 part by mass or more relative to 100 parts by mass of component (A), it is preferred because it will have a sufficiently large viscosity increasing effect, whereas a content of 30 parts by mass or less is preferred because it serves to avoid a decrease in heat resistance. For an example that meets SMC (II), it is preferable that the epoxy resin composition also meets (I). More specifically, it is preferable that component (C) in the epoxy resin composition contains a compound having 3 or more and 6 or less isocyanate groups in one molecule and at the same time component (D) has a hydroxy group equivalent weight of 20 or more and 120 or less, or that component (D) in the epoxy resin composition contains a compound having 3 or more and 6 or less hydroxy groups in one molecule and at the same time component (D) has a hydroxy group equivalent weight of 20 or more and 120 or less. When the former is met, good flow properties are expected to develop after conversion into the B stage, whereas when the latter is met, addition of a small amount can serve to obtain a resin adequately converted into the B stage. If both the former and latter are met, it is preferable because the addition of a small amount will have a sufficiently large viscosity increasing effect while maintaining a required viscosity without suffering its decrease when heated.

For an example that meets SMC (II), it is preferable for the epoxy resin composition, as the epoxy resin composition that meets SMC (I), to further contain the aforementioned component (E) and also contain the aforementioned component (F). Preferred compounds, properties, contents of component (E) and component (F) are the same as those for the epoxy resin composition of the SMC that meets (I).

For an example that meets SMC (II), the films attached to both surfaces of the SMC can be removed easily to ensure a high handleability when the epoxy resin composition contained in the SMC has a viscosity at 30° C. of $3.0 \times 10^4$ Pa·s or more, as measured by a DMA apparatus (ARES, manufactured by TA Instruments), because the resin viscosity is moderately high while ensuring a low stickiness. In addition, if the viscosity at 30° C. of the epoxy resin composition after conversion into the B stage is $1.0 \times 10^6$ Pa·s or less, the SMC will maintain its flexibility to ensure a high shape conformity to the mold. From the viewpoint of the handleability, the viscosity at 30° C. of the epoxy resin composition after conversion into the B stage is preferably $5.0 \times 10^4$ Pa·s or more and $1.0 \times 10^6$ Pa·s or less.

Next, when the epoxy resin composition after conversion into the B stage has a viscosity of $1.0 \times 10^2$ Pa·s or more at the molding temperature, for example 120° C., the resin in the SMC will be prevented from flowing out alone ahead the other components to allow the carbon fiber and the resin to expand closely together during the SMC press molding step to permit the production of a fiber reinforced composite material having a high surface quality and good strength properties. When the epoxy resin composition after conversion into the B stage has a viscosity of $5.0 \times 10^3$ Pa·s or less at 120° C., furthermore, the SMC will expand sufficiently in the mold while maintaining a uniform thickness and avoiding the formation of non-filled portions during the press molding step to permit the production of a fiber reinforced composite material with little unevenness in surface quality and strength properties. From the viewpoint of unevenness in the properties of the resulting fiber reinforced composite material, the viscosity at 120° C. of the epoxy resin composition after conversion into the B stage is preferably $1.0 \times 10^2$ Pa·s or more and $2.0 \times 10^3$ Pa·s or less. Furthermore, it is preferable for the epoxy resin composition after conversion into the B stage to undergo smaller viscosity changes in high temperature regions, and preferably satisfies:

$$1 \leq A/B \leq 100$$

A is the viscosity at 70° C. and B is the viscosity at 130° C.

It is more preferable that the equation below is also satisfied:

$$1 \leq A/B \leq 50$$

For an example that meets SMC (II), there are no specific limitations on the carbon fiber to be used, and the carbon fibers that can be used for the SMC meeting (I) can also be useful.

The SMC that meets (II) is the same as the SMC that meets (I) except that the aforementioned angle a and angle b of the bundle-shaped aggregates of discontinuous carbon fibers are specific and they differ in terms of the components and viscosity properties thereof of the epoxy resin composition, and accordingly there are no specific limitations on the production method thereof, as in the production method for the SMC that meets (I), as long as the cutting machine used to cut continuous carbon fiber bundles to prepare bundle-shaped aggregates of discontinuous carbon fibers can meet the aforementioned specifics for angle a and angle b. For example, the SMC that meets (II) can be produced by impregnating discontinuous carbon fibers, which are cut by the aforementioned cutting machine that meets the aforementioned specifics for angle a and angle b, with a mixture of the components of an epoxy resin composition meeting (II) by a generally known method, and then maintaining the temperature from room temperature to about 80° C. for a few hours to a few days so that the resin composition comes in a semicured state as the viscosity rise levels off. The conditions for conversion into the B stage, presumed mechanism and the like, are the same as those described for the production method of the SMC that meets (I).

The fiber reinforced composite material that meets (II) is produced by curing the SMC that meets (II). Commonly, when intended for use in the field of automobile production, in particular, fiber reinforced composite materials produced by curing SMCs are required to have good mechanical properties including high heat resistance and bending strength. For the fiber reinforced composite material, the epoxy resin used as matrix resin will have a glass transition temperature of 140° C. or more and 250° C. or less after being cured, even when curing is carried out at 140° C., and accordingly the good mechanical properties of the cured epoxy resin are reflected in the resulting composite material, which accordingly has a high bending strength of 250 MPa or more, or 300 MPa or more in a more preferred example, even when bending strength test is performed at 150° C. In addition, the fiber reinforced composite material that meets (II) is produced by press molding a SMC that contains an epoxy resin composition showing good flow properties after conversion into the B stage and bundle-shaped aggregates of discontinuous carbon fibers, both having very high homogeneity, and accordingly, it suffers from few surface irregularities due to sink marks on the resin and has a high surface quality with an arithmetic average surface roughness Ra of 0.4 m or less, or 0.3 m or less in a more preferred example.

Next, the prepreg is described below.

The prepreg contains an epoxy resin composition having the components (A) to (D) impregnated into reinforcing fibers, and component (D) has a hydroxy group equivalent weight of 20 or more and 120 or less:

component (A): an epoxy resin,
component (B): a curing agent,
component (C): a polyisocyanate compound, and
component (D): a polyol compound.

The prepreg contains an epoxy resin composition having the components (A) to (D) impregnated into reinforcing fibers, and component (D) has a hydroxy group equivalent weight of 20 or more and 120 or less: Preferred compounds, properties, contents of component (A), component (B), component (C), and component (D) are the same as those for the SMC that meets (II).

In addition, it is preferable for the prepreg to meet either of 1 and 2, and more preferably meet both thereof. If either of 1 and 2 is met, moldings free of disorders in the arrangement or orientation of the reinforcing fibers can be produced easily without excessive flow of the resin or reinforcing fibers during the molding process.

1. component (C) contains a compound having 3 or more and 6 or less isocyanate groups in one molecule, and
2. component (D) contains a compound having 3 or more and 6 or less hydroxy groups in one molecule.

There are no specific limitations on the form and constitution of the prepreg, and it has a generally known form and constitution including reinforcing fibers in a continuous form. There are no specific limitations on the reinforcing fibers, but useful ones include glass fiber, carbon fiber, graphite fiber, aramid fiber, boron fiber, alumina fiber, and silicon carbide fiber. A plurality of these reinforcing fibers may be used as a mixture. In particular, the use of carbon fiber or graphite fiber is preferred to provide a lightweight, high-durability fiber reinforced composite material. With a high specific modulus and specific strength, carbon fiber is used favorably, particularly when applied to the production of lightweight or high-strength materials. There are no specific limitations on the form and alignment of the reinforcing fibers, and useful fiber structures include, for instance, long fibers paralleled in one direction, single tow, woven fabric, knit fabric, nonwoven fabric, mat, and braid.

It is preferable that the prepreg is in the form of carbon fibers impregnated with an epoxy resin composition for fiber reinforced composite material production, and the mass fraction of the carbon fibers in the prepreg is preferably 40 to 90 mass %, more preferably 50 to 80 mass %. If the mass fraction of the carbon fibers is too small, the resulting composite material will be too heavy and the advantage of the fiber reinforced composite material having high specific strength and specific modulus will be impaired in some instances, whereas if the mass fraction of carbon fibers is too large, impregnation with the epoxy resin composition will not be achieved sufficiently and the resulting composite material will suffer from many voids, possibly leading to large deterioration in mechanical properties.

The prepreg can be produced favorably by some different methods including a wet method in which reinforcing fibers are immersed in and impregnated with the aforementioned epoxy resin composition or a resin solution containing the aforementioned epoxy resin composition impregnated into a solvent to decrease the viscosity and a hot melt method in which the aforementioned epoxy resin composition is heated to decrease its viscosity and then used to impregnate reinforcing fibers.

In the wet method, reinforcing fibers are immersed in a tank containing the epoxy resin composition and converted into the B stage using a tool such as oven to provide a prepreg.

In the hot melt method, an epoxy resin composition, with its viscosity decreased by heating, is used directly to impregnate reinforcing fibers. Alternatively, resin films are prepared by coating release paper or the like with an epoxy resin composition and the resin films are used to cover either or both sides of reinforcing fiber sheets and pressed under heat so that the epoxy resin composition is transferred to them for impregnation and converted into the B stage, thereby producing a prepreg.

It is considered that such conversion into the B stage is realized by maintaining the temperature, for example, at 40° C. for 24 hours through a reaction mainly between isocyanate groups in the polyisocyanate compound and hydroxy groups in the alcohol compound, and the viscosity of the epoxy resin composition after conversion into the B stage (that is, the epoxy resin composition contained in the prepreg), which is measured at the molding temperature, for example 120° C., using a DMA (ARES, manufactured by TA Instruments), is preferably 10 Pa·s or more and 100,000 Pa·s or less, more preferably 100 Pa·s or more and 10,000 Pa·s or less. The range may be between either upper limit and either lower limit. Furthermore, it is preferable for the epoxy resin composition after conversion into the B stage to undergo smaller viscosity changes in high temperature regions, and preferably satisfies:

$$1 \leq A/B \leq 2{,}000$$

A is the viscosity at 70° C. and B is the viscosity at 130° C.

It is more preferable that the equation below is also satisfied:

$$1 \leq A/B \leq 1{,}000$$

The prepreg can produce easily a fiber reinforced composite material having a high surface quality and good strength properties even by high pressure press molding without suffering from an uneven distribution of the fiber content by weight due to an excessive resin flow or disorders in the fiber arrangement or orientation. When performing hybrid molding of the SMC in combination with other materials, the above effect can also be realized to permit the production of moldings having a high surface quality. Not only press molding but also other generally known molding methods may serve to produce intended moldings.

Furthermore, it is preferable for the prepreg, as the aforementioned SMC, to further contain the aforementioned component (E) and also contain the aforementioned component (F). Preferred compounds, properties, contents of component (E) and component (F) are the same as those for the aforementioned SMC.

The hybrid molded product is produced by curing a combination of a SMC and the prepreg. There are no specific limitations on the SMC, and various SMCs containing generally known reinforcing fibers and resins may be useful, although the use of the SMC is preferred. The hybrid molded product is little liable to disorders in the arrangement or orientation of the reinforcing fibers in the prepreg during the molding step to allow the molded product to develop dimensional accuracy and mechanical properties stably.

EXAMPLES

The SMC and prepreg will now be illustrated in more detail with reference to examples, but it should be understood that this disclosure is not construed as being limited to them.

Resin Materials

The following input resin materials were used to prepare an epoxy resin composition in each Example and Comparative Example.

1. Epoxy Resin Used as Component (A)

Epotohto (registered trademark) YD128 (manufactured by Nippon Steel & Sumikin Chemical Co., Ltd.): liquid bisphenol A type epoxy resin jER (registered trademark) 154 (manufactured by Mitsubishi Chemical Corporation): solid phenol novolac type epoxy resin jER (registered trademark) 1001 (manufactured by Mitsubishi Chemical Corporation): solid bisphenol A type epoxy resin jER (registered trademark) 1007 (manufactured by Mitsubishi Chemical Corporation): solid bisphenol A type epoxy resin YDF (registered trademark) 2001 (manufactured by Nippon Steel & Sumitomo Metal Corporation): solid bisphenol F type epoxy resin ERISYS (registered trademark) GE-21 (manufactured by PTI Japan Corporation): 1,4-butanediol diglycidyl ether ERISYS (registered trademark) GE-22 (manufactured by PTI Japan Corporation): cyclohexanedimethanol diglycidyl ether Denacol (registered trademark) EX-211 (manufactured by Nagase ChemteX Corporation): neopentyl glycol diglycidyl ether Denacol (registered trademark) EX-212 (manufactured by Nagase ChemteX Corporation): 1,6-hexanediol diglycidyl ether Denacol (registered trademark) EX-313 (manufactured by Nagase ChemteX Corporation): glycerol polyglycidyl ether 2. Dicyandiamide or a Derivative Thereof Used as Component (B)

jER Cure (registered trademark) DICY7 (manufactured by Mitsubishi Chemical Corporation): dicyandiamide 3. Polyisocyanate Compound Used as Component (C)

Lupranate (registered trademark) M20S (manufactured by BASF INOAC Polyurethanes Ltd., number of isocyanate groups: 3): polymeric MDI (polymethylene polyphenyl polyisocyanate)

Lupranate (registered trademark) MI (manufactured by BASF INOAC Polyurethanes Ltd., number of isocyanate groups: 2): monomeric MDI (diphenylmethane diisocyanate)

phenyl isocyanate (manufactured by Tokyo Chemical Industry Co., Ltd., number of isocyanate groups: 1)

4. Alcohol Compound Used as Component (D)

ethylene glycol (manufactured by Tokyo Chemical Industry Co., Ltd., number of hydroxy groups: 2, hydroxy group equivalent weight: 31)

glycerin (manufactured by Tokyo Chemical Industry Co., Ltd., number of hydroxy groups: 3, hydroxy group equivalent weight: 31)

diglycerol (manufactured by Tokyo Chemical Industry Co., Ltd., number of hydroxy groups: 4, hydroxy group equivalent weight: 27)

PEG600 (manufactured by Kanto Chemical Co., Inc., number of hydroxy groups: 2, hydroxy group equivalent weight: 300)

jER (registered trademark) 1004 (manufactured by Mitsubishi Chemical Corporation, number of hydroxy groups: 5.7, hydroxy group equivalent weight: 340)

Denacol (registered trademark) EX-611 (manufactured by Nagase ChemteX Corporation, number of hydroxy groups: 2, hydroxy group equivalent weight: 263)

1-butanol (manufactured by Tokyo Chemical Industry Co., Ltd., number of hydroxy groups: 1, hydroxy group equivalent weight: 74)

5. Compound Used as Component (E)

tetrabuthyl ammonium bromide (manufactured by Tokyo Chemical Industry Co., Ltd.)

tetraphenylphosphonium bromide (manufactured by Tokyo Chemical Industry Co., Ltd.)

2-methyl imidazole (manufactured by Tokyo Chemical Industry Co., Ltd.)

triphenyl phosphine (manufactured by Tokyo Chemical Industry Co., Ltd.)

6. Urea Compound as Represented by Aforementioned Formula (1) Used as Component (F)

Omicure (registered trademark) 52 (manufactured by PTI Japan Corporation): 4,4'-methylene-bis(phenyl dimethylurea)

DCMU 99 (registered trademark) (manufactured by Hodogaya Chemical Co., Ltd.): 3-(3,4-dichlorophenyl)-1,1-dimethylurea Preparation of Epoxy Resin Composition Epoxy resin compositions were prepared by mixing the components according to the proportions specified in the Tables. In the Tables, the FIGURES in the columns for the components of each epoxy resin composition show their contents, which are expressed in parts by mass unless otherwise specified.

Preparation of Cured Resin Plate

The epoxy resin composition prepared above was deaerated under reduced pressure and injected in a mold that was set up so that the thickness would be 2 mm by a 2 mm thick Teflon (registered trademark) spacer. Curing was performed at a temperature of 140° C. for 2 hours to provide a cured resin plate having a thickness of 2 mm.

Preparation of SMC and preparation of SMC-based fiber reinforced composite material Torayca (registered trademark) T700S-12K (manufactured by Toray Industries, Inc.) was used as carbon fiber. The aforementioned continuous carbon fiber strands were cut at an appropriate angle and scattered while ensuring uniform dispersion of bundle-shaped aggregates of carbon fibers to prepare a nonwoven fabric of isotropically oriented discontinuous carbon fibers. A rotary type cutter was used as cutting machine. The blade interval was 30 mm. The nonwoven fabric of discontinuous carbon fibers had a fiber areal weight of 1 kg/m2.

A nonwoven fabric of discontinuous carbon fibers was sandwiched between polyethylene films coated with the aforementioned epoxy resin composition such that the carbon fiber weight content in the resulting SMC would be 40%, and pressed under a roller to achieve impregnation with the aforementioned epoxy resin composition to prepare a sheet-shaped SMC precursor. This SMC precursor was converted into the B stage by maintaining it at 40° C. for 24 hours to provide a SMC.

Two sheets of this SMC were stacked and cured at about 140° C. for 5 minutes under a pressure of 10 MPa applied by a compression type press machine to produce a 300× 400×1.6 (thickness) mm plate of a fiber reinforced composite material.

Production Method for Prepreg and Preparation of Prepreg-Based Fiber Reinforced Composite Material A plain weave woven fabric (CO06273C) of Torayca (registered trademark) T700S-12K (manufactured by Toray Industries, Inc.) was used as carbon fiber. This plain weave woven fabric was immersed in a tank containing the epoxy resin composition prepared above and then pulled out, followed by removing the excess resin so that the fiber weight content would be 60% to prepare a prepreg precursor. This was converted into the B stage by maintaining it at 40° C. for 24 hours to provide a prepreg. Eight sheets of this prepreg were stacked and cured at about 140° C. for 5 minutes under a pressure of 10 MPa applied by a compression type press machine to produce a plate of a fiber reinforced composite material.

Evaluation

The evaluations in each Example were made as described below. The number of measuring runs n is one (n=1) unless specified otherwise.

1. Measurement of Viscosity of Resin Composition Immediately after Preparation

The viscosity of a specimen to be examined was measured according to the "Viscosity Measuring Method with a Cone-Plate Type Rotational Viscometer" specified in JIS Z 8803 (1991) using an E type viscometer equipped with a standard cone rotor (1° 34'×R24) while maintaining the temperature at 70° C. The E type viscometer used was a TVE-30H manufactured by Tokimec, Inc. To prepare a specimen, all components were mixed and stirred for one minute and the resulting epoxy resin composition was used.

2. Measurement of Viscosity of Resin Composition after Conversion into the B Stage A specimen for measurement was put on the sample stage heated at 30° C. in a DMA apparatus (ARES, manufactured by TA Instruments) and its viscosity was measured while heating at 10° C./min. To prepare a specimen, all components were mixed and the resulting epoxy resin composition was maintained at 40° C. for 24 hours. The viscosity at 70° C., for example, means the viscosity of a specimen measured when it reaches 70° C., and its viscosity at different temperatures were measured in a similar manner.

3. Measurement of Glass Transition Temperature Tg of Cured Epoxy Resin

A test piece with a width of 12.7 mm and a length of 40 mm was cut out of a cured resin plate and the Tg was measured using a DMA apparatus (ARES, manufactured by TA Instruments). Measurement was performed at a temperature increase rate of 5° C./min. The temperature at the inflection point on the storage elastic modulus G' curve obtained by the measurement was defined as the Tg.

4. Measurement of Glass Transition Temperature Tg of Cured Epoxy Resin

A test piece with a width of 12.7 mm and a length of 40 mm was cut out of a cured resin plate and the Tg was measured using a DMA apparatus (ARES, manufactured by TA Instruments). Measurement was performed at a temperature increase rate of 5° C./min. The temperature at the inflection point on the storage elastic modulus G' curve obtained by the measurement was defined as the Tg.

5. Evaluation of Handleability of SMC at 30° C.

For the SMCs prepared above, the handleability was evaluated in terms of the removability of the films and the shape conformity to the mold. A SMC was rated as A when the films were removed from the SMC, only the films were able to be separated easily without carbon fibers or resin being attached on the film surfaces and without separation between SMC layers and also where the SMC conformed to the mold when it was set in the mold. A SMC was rated as B when it failed to meet at least either of the above requirements.

6. Measurement of Arithmetic Average of Surface Roughness Ra of SMC-Based Fiber Reinforced Composite Material From a plate of a fiber reinforced composite material prepared as described above, five test pieces with a size of 80×30×1.6 mm were cut out in the 0° direction (length direction of the plate is defined as 0°) and another five test pieces were cut out in the 90° direction (10 test pieces in total). The arithmetic average surface roughness of each test piece was measured using a surface roughness measuring apparatus (Surfcom 480 A, manufactured by Tokyo Seimitsu Co., Ltd.), and the average over all test pieces was adopted as Ra. Measurement was performed at a crosshead speed of 0.3 mm/s.

7. Measurement of Bending Strength at 150° C. of SMC-Based Fiber Reinforced Composite Material From a plate of a fiber reinforced composite material prepared as described above, five test pieces with a size of 100×25×1.6 mm were cut out in the 0° direction (length direction of the plate is defined as 0°) and another five test pieces were cut out in the 90° direction (10 test pieces in total) for measurement at a temperature of 150° C. according to JIS K7074 (1988).

8. Surface Quality of Prepreg-Based Fiber Reinforced Composite Material

From a plate-like fiber reinforced composite material as prepared above, square test pieces with a size of 10×10 cm were cut out and subjected to fiber alignment disorder measurement. For test pieces cut out in the 0° and 90° directions, the maximum meandering width of the fibers was measured at appropriately selected five points and the average of the measurements was calculated. Each test piece was rated as A when it was 2 mm or less, B when it was 4 mm or less, and C when it was more than 4 mm.

Examples A101 to A109

Components (A) to (D) were mixed in the proportion specified in Table 1 to prepare an epoxy resin composition, and its viscosity at 70° C. immediately after preparation was measured. Then, each epoxy resin composition was converted into the B stage by maintaining it at 40° C. for 24 hours, and its viscosity at 120° C. was measured. In addition, each epoxy resin composition before conversion into the B stage was combined with bundle-shaped aggregates of carbon fibers having an angle a and an angle b as given in Table 1 to prepare a SMC and a fiber reinforced composite material, followed by measuring the bending strength. Only the substances of components (A) to (D) and the proportion among them differed among Examples A101 to A109. In all examples, the epoxy resin composition immediately after preparation had a viscosity at 70° C. of 1,000 mPa·s or less, and accordingly it worked properly in impregnating carbon fibers in the SMC preparation step. In addition, the resin after conversion into the B stage had a viscosity at 120° C. of 100,000 mPa·s or less and meets the aforementioned requirement of 1≤A/B≤100, and accordingly its flowability was favorable in the SMC hot press molding step. Furthermore, the cured resin had a Tg of 140° C. or more, and the fiber reinforced composite material also had favorable heat resistance and mechanical properties including a bending strength at 150° C. of 250 MPa or more.

Examples A110 to A115

In addition to components (A) to (D), the compounds given in Table 2 were also mixed as components (E) and (F) in the proportion specified in Table 2 to prepare epoxy resin compositions, and the viscosity at 70° C. immediately after preparation was measured. Then, each epoxy resin composition was converted into the B stage by maintaining it at 40° C. for 24 hours, and its viscosity at 120° C. was measured. Furthermore, each epoxy resin composition before conversion into the B stage was combined with bundle-shaped aggregates of carbon fibers having an angle a and an angle b as given in Table 2 to prepare a SMC and a fiber reinforced composite material, followed by measuring the bending strength. Only the substances of components (A) to (F) and the proportion among them differed among Examples A110 to A115. In all examples, the epoxy resin composition immediately after preparation had a viscosity at 70° C. of 1,000 mPa·s or less, and accordingly it worked properly in impregnating carbon fibers in the SMC preparation step. In addition, the resin after conversion into the B stage had a viscosity at 120° C. of 100,000 mPa·s or less and meets the aforementioned requirement of 1≤A/B≤100, and accordingly its flowability was favorable in the SMC hot press molding step. Furthermore, the cured resin had a Tg of 140° C. or more, and the fiber reinforced composite material also had favorable heat resistance and mechanical properties including a bending strength at 150° C. of 250 MPa or more.

Examples B01 to B09

Using epoxy resin compositions before conversion into the B stage composed of the same components as in Examples A101 to A109, prepregs and fiber reinforced composite materials were prepared, and the surface quality of each prepreg-based fiber reinforced composite material was evaluated. The components used and results obtained are shown in Table 7.

Examples B10 to B15

Using epoxy resin compositions before conversion into the B stage composed of the same components as in Examples A110 to A115, prepregs and fiber reinforced composite materials were prepared, and the surface quality of each prepreg-based fiber reinforced composite material was evaluated. The components used and results obtained are shown in Table 8.

Comparative Example A101

Except for using a different compound for component (C) and mixing components (A) to (D) in the proportion given in Table 5, the same procedure as in Example A101 was carried out to prepare an epoxy resin composition, and the viscosity at 70° C. immediately after preparation was measured. Then, the epoxy resin composition was converted into the B stage by maintaining it at 40° C. for 24 hours, and its viscosity at 120° C. was measured. A SMC and fiber-reinforced composite material were prepared by the same procedure as in Example A101, and the bending strength was measured. The epoxy resin composition immediately after preparation had a viscosity at 70° C. of 500 mPa·s, and accordingly it worked properly in impregnating carbon fibers in the SMC preparation step. However, the resin after conversion into the B stage had a viscosity at 120° C. of 20 Pa·s and had an A/B ratio of 1,700, and its flowability was poor in the SMC hot press molding step. On the other hand, the cured resin had a Tg of 140° C., and the fiber reinforced composite material also had favorable heat resistance and mechanical properties including a bending strength at 150° C. of 240 MPa. Comparative Example A102

Except for using different compounds for component (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, the epoxy resin composition was converted into the B stage by maintaining it at 40° C. for 24 hours, and the viscosity at 120° C. was measured. A SMC and fiber-reinforced composite material were prepared by the same procedure as in Comparative Example A101, and the bending strength was measured. The epoxy resin composition immediately after preparation had a viscosity at 70° C. of 800 mPa·s, and accordingly it worked properly in impregnating carbon fibers in the SMC preparation step. The resin after conversion into the B stage had a viscosity at 120° C. of 900 Pa·s and had an A/B ratio of 40, and its flowability was favorable in the SMC hot press molding step. However, the cured resin had a Tg of 100° C., and the fiber reinforced composite material failed to develop high heat resistance and good mechanical properties unique to epoxy resins, showing a bending strength at 150° C. of 190 MPa.

Comparative Example A103

Except for using different compounds for components (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 2,500 mPa·s, and it failed to work properly in impregnating carbon fibers in the SMC preparation step. The resin after conversion into the B stage had a viscosity at 120° C. of 50 Pa·s and had an A/B ratio of 600, and its flowability was poor in the SMC hot press molding step. However, the cured resin had a Tg of 140° C., and the fiber reinforced composite material had favorable heat resistance and mechanical properties including a bending strength at 150° C. of 240 MPa.

Comparative Example A104

Except for using different compounds for components (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 2,300 mPa·s, and it failed to work properly in impregnating carbon fibers in the SMC preparation step. The resin after conversion into the B stage had a viscosity at 120° C. of 80 Pa·s and had an A/B ratio of 580, and its flowability was poor in the SMC hot press molding step. However, the cured resin had a Tg of 145° C., and the fiber reinforced composite material had favorable heat resistance and mechanical properties including an H/W bending strength of 245 MPa.

Comparative Example A105

Except for using different compounds for components (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 300 mPa·s, and it worked properly in impregnating carbon fibers in the SMC preparation step. The resin after conversion into the B stage had a viscosity at 120° C. of 0.1 Pa·s and had an A/B ratio of 120, and the flowability was poor in the SMC hot press molding step. However, the cured resin had a Tg of 140° C., and the fiber reinforced composite material had favorable heat resistance and mechanical properties including a bending strength at 150° C. of 240 MPa.

Comparative Example A106

Except for using different compounds for component (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 200 mPa·s, and it worked properly in impregnating carbon fibers in the SMC preparation step. The resin after conversion into the B stage had a viscosity at 120° C. of 0.05 Pa·s and had an A/B ratio of 140, and the flowability was poor in the SMC hot press molding step. The cured resin had a Tg of 134° C., and the fiber reinforced composite material had poor heat resistance and mechanical properties including a bending strength at 150° C. of 223 MPa.

Comparative Example A107

Except for using different compounds for component (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 400 mPa·s, and it worked properly in impregnating carbon fibers in the SMC preparation step. The resin after conversion into the B stage had a viscosity at 120° C. of 0.08 Pa·s and had an A/B ratio of 200, and the flowability was poor in the SMC hot press molding step. The cured resin had a Tg of 130° C., and the fiber reinforced composite material had poor heat resistance and mechanical properties including a bending strength at 150° C. of 210 MPa.

Comparative Example A108

Except for using different compounds for component (C) and component (D) and mixing components (A) to (D) in the proportion given in Table 5, the same procedure as in Comparative Example A101 was carried out to prepare an epoxy resin composition, and the viscosity at 70° C. immediately after preparation was measured. Then, each epoxy resin composition was converted into the B stage by maintaining it at 40° C. for 24 hours, and the viscosity at 120° C. was measured. A SMC and fiber reinforced composite material were prepared by the same procedure as in Comparative Example A101, and the bending strength was measured. The epoxy resin composition immediately after preparation had a viscosity at 70° C. of 440 mPa·s, and it worked properly in impregnating carbon fibers in the SMC preparation step. The resin after conversion into the B stage had a viscosity at 120° C. of 0.09 Pa·s and had an A/B ratio of 160, and the flowability was poor in the SMC hot press molding step. The cured resin had a Tg of 127° C., and the fiber reinforced composite material had poor heat resistance and mechanical properties including a bending strength at 150° C. of 200 MPa.

Example B16

Using the same epoxy resin composition before conversion into the B stage as in Comparative Examples A101, a prepreg and a fiber reinforced composite material were prepared, and the surface quality of the prepreg-based fiber reinforced composite material was evaluated. The components used and results obtained are shown in Table 9.

Comparative Examples B01 to B07

Using the same epoxy resin compositions before conversion into the B stage as in Comparative Examples A102 to A108, prepregs and fiber reinforced composite materials were prepared, and the surface quality of the prepreg-based fiber reinforced composite materials were evaluated. The components used and results obtained are shown in Table 9.

Example A201

The compounds given in Table 3 were used as components (A) to (D) and mixed in the proportion specified in Table 3 to prepare an epoxy resin composition, and the viscosity at 70° C. immediately after preparation was measured. Then, the epoxy resin composition was converted into the B stage by maintaining it at 40° C. for 24 hours, and the viscosity at 30° C. and 120° C. was measured. Furthermore, the epoxy resin composition before conversion into the B stage was combined with bundle-shaped aggregates of carbon fibers having an angle a and an angle b as given in Table 3 to prepare a SMC and a fiber reinforced composite material, followed by measuring the arithmetic average roughness Ra and the bending strength. Results are shown in Table 3. The epoxy resin composition immediately after preparation worked properly in impregnating carbon fibers in the SMC preparation step. The handleability at 30° C. of the SMC after conversion into the B stage was also high. Furthermore, results on the viscosity at 120° C. of the resin and the A/B ratio showed a particularly good flowability in the SMC hot press molding step. The cured resin had a Tg of 143° C., and the fiber reinforced composite material also had a favorable heat resistance, surface quality, and mechanical properties.

Example A202

Except for using a different compound for component (C) and mixing components (A) to (D) in the proportion given in Table 3, the same procedure as in Example A201 was carried out to prepare an epoxy resin composition, and the viscosity at 70° C. immediately after preparation was measured. Then, the epoxy resin composition was converted into the B stage by maintaining it at 40° C. for 24 hours, and the viscosity at 30° C. and 120° C. was measured. A SMC and a fiber reinforced composite material were prepared by the same procedure as in Example A201, and the arithmetic average roughness Ra and the bending strength were measured. Results are shown in Table 3. The epoxy resin composition immediately after preparation worked properly in impregnating carbon fibers in the SMC preparation step. The handleability of the SMC at 30° C. after conversion into the B stage was also high. Furthermore, results on the viscosity at 120° C. of the resin showed a good flowability in the SMC hot press molding step. The cured resin had a Tg of 142° C., and the fiber reinforced composite material also had a favorable heat resistance, surface quality, and mechanical properties.

Examples A203 to A205

Except for using a different compound for component (D) and mixing components (B) to (D) in the proportion given in Table 3, the same procedure as in Example A201 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A201, and the arithmetic average roughness Ra and the bending strength were measured. Results are shown in Table 3. In all examples, the epoxy resin composition immediately after preparation worked properly in impregnating carbon fibers in the SMC preparation step. In all examples, the handleability at 30° C. of the SMC after conversion into the B stage was also high. In all examples, furthermore, the aforementioned requirement of 1≤A/B≤100 was met and the viscosity at 120° C. of the resin showed a particularly good flowability in the SMC hot press molding step. In all examples, the cured resin had a Tg of 140° C. or more, and the fiber reinforced composite material also had a favorable heat resistance, surface quality, and mechanical properties.

Examples A206 to A208

Except for using either component (E) alone or component (E) and component (F) in addition to components (A) to (D) and mixing components (A) to (F) in the proportion given in Table 3, the same procedure as in Example A204 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A204, and the arithmetic average roughness Ra and the bending strength were measured. Results are shown in Table 3. In all examples, the epoxy resin composition immediately after preparation worked properly in impregnating carbon fibers in the SMC preparation step. In all examples, the handleability of the SMC at 30° C. after conversion into the B stage was also high. In all examples, furthermore, results on the viscosity at 120° C. of the resin and the A/B ratio showed a particularly good flowability in the SMC hot press molding step. In all examples, the cured resin had a Tg of 140° C. or more, and the fiber reinforced composite material also had a favorable heat resistance, surface quality, and mechanical properties.

Examples A209 and A210

Except for using an altered angle a and angle b, the same procedure as in Example A206 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A206, and the arithmetic average roughness Ra and the bending strength were measured. Results are shown in Table 3. In all examples, the epoxy resin composition immediately after preparation worked properly in impregnating carbon fibers in the SMC preparation step. In all examples, the handleability of the SMC at 30° C. after conversion into the B stage was also high. In all examples, furthermore, the aforementioned requirement of $1 \leq A/B \leq 100$ was met and the viscosity at 120° C. of the resin showed a particularly good flowability in the SMC hot press molding step. In all examples, the cured resin had a Tg of 140° C. or more, and the fiber reinforced composite material also had a favorable heat resistance, surface quality, and mechanical properties.

Examples A211 to A220

Except for using different compounds for components (A) and (D) and mixing components (A) to (D) in the proportion given in Table 4, the same procedure as in Example A201 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A201, and the arithmetic average roughness Ra and the bending strength were measured. Results are shown in Table 4. In all examples, the epoxy resin composition immediately after preparation worked properly in impregnating carbon fibers in the SMC preparation step. In all examples, the handleability at 30° C. of the SMC after conversion into the B stage was also high. In all examples, furthermore, the aforementioned requirement of $1 \leq A/B \leq 100$ was met and the viscosity at 120° C. of the resin showed a particularly good flowability in the SMC hot press molding step. In all examples, the cured resin had a Tg of 140° C. or more, and the fiber reinforced composite material also had a favorable heat resistance, surface quality, and mechanical properties.

Examples A221 to A224

Except for using different compounds for components (A) and (D) and mixing components (A) to (D) in the proportion given in Table 4, the same procedure as in Example A212 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A212, and the arithmetic average roughness Ra and the bending strength were measured. Results are shown in Table 4. In all examples, the epoxy resin composition immediately after preparation worked properly in impregnating carbon fibers in the SMC preparation step. In all examples, the handleability at 30° C. of the SMC after conversion into the B stage was also high. In all examples, furthermore, the aforementioned requirement of $1 \leq A/B \leq 100$ was met and the viscosity at 120° C. of the resin showed a particularly good flowability in the SMC hot press molding step. In all examples, the cured resin had a Tg of 140° C. or more, and the fiber reinforced composite material also had a favorable heat resistance, surface quality, and mechanical properties.

Examples A225 and A226

Except for using either component (E) alone or component (E) and component (F) in addition to components (A) to (D), and mixing components (A) to (F) in the proportion given in Table 4, the same procedure as in Example A219 was carried out to prepare an epoxy resin composition, and the viscosity at 70° C. immediately after preparation was measured. Then, each epoxy resin composition was converted into the B stage by maintaining it at 40° C. for 24 hours, and the viscosity at 30° C. and 120° C. was measured. A SMC and a fiber reinforced composite material were prepared by the same procedure as in Example A219, and the arithmetic average roughness Ra and the bending strength were measured. Results are shown in Table 4. In all examples, the epoxy resin composition immediately after preparation worked properly in impregnating carbon fibers in the SMC preparation step. In all examples, the handleability at 30° C. of the SMC after conversion into the B stage was also high. In all examples, furthermore, the aforementioned requirement of $1 \leq A/B \leq 100$ was met and the viscosity at 120° C. of the resin showed a particularly good flowability in the SMC hot press molding step. In all examples, the cured resin had a Tg of 140° C. or more, and the fiber reinforced composite material also had a favorable heat resistance, surface quality, and mechanical properties.

Comparative Example A201 and A202

The same procedure as in Example A202 was carried out to prepare an epoxy resin composition, and the viscosity at 70° C. immediately after preparation was measured. Then, the aforementioned epoxy resin composition was converted into the B stage by maintaining it at 40° C. for 24 hours, and the viscosity at 30° C. and 120° C. was measured. Furthermore, except for using the aforementioned epoxy resin composition before conversion into the B stage in combination with bundle-shaped aggregates of discontinuous carbon fibers having an altered angle a and angle b as given in Table to prepare a SMC and a fiber reinforced composite material, followed by measuring the arithmetic average roughness Ra and the bending strength. Results are shown in Table 6. The epoxy resin composition immediately after preparation worked properly in impregnating carbon fibers in the SMC preparation step. The handleability at 30° C. of the SMC after conversion into the B stage was also high. Furthermore, results on the viscosity at 120° C. of the resin showed a good flowability in the SMC hot press molding step. Although the cured resin had a Tg of 142° C., showing a high heat resistance, the fiber reinforced composite material had poor surface quality and mechanical properties in all examples.

Comparative Example A203

Except for mixing components (A) to (D) in the proportion given in Table 6, the same procedure as in Example A204 was carried out to prepare an epoxy resin composition, and the viscosity at 70° C. immediately after preparation was measured. Then, the aforementioned epoxy resin composition was converted into the B stage by maintaining it at 40° C. for 24 hours, and the viscosity at 30° C. and 120° C. was measured. A SMC and a fiber reinforced composite material were prepared by the same procedure as in Example A204, and the arithmetic average roughness Ra and the bending strength were measured. Results are shown in Table 6. The epoxy resin composition immediately after preparation worked properly in impregnating carbon fibers in the SMC preparation step. The SMC after conversion into the B stage was so low in shapeability that it totally failed to flow closely along the wall of the mold, leading to a low SMC handleability at 30° C. Furthermore, results on the viscosity at 120° C. of the resin and the A/B ratio showed a particularly good flowability in the SMC hot press molding step. The cured resin had a Tg of 155° C., and the fiber reinforced composite material also had a favorable heat resistance, surface quality, and mechanical properties.

Comparative Example A204

Except for not including components (C) and (D), the same procedure as in Comparative Example A201 was carried out to prepare an epoxy resin composition, and the viscosity at 70° C. immediately after preparation was measured. Then, the aforementioned epoxy resin composition was converted into the B stage by maintaining it at 40° C. for 24 hours, and the viscosity at 30° C. and 120° C. was measured. A SMC and a fiber reinforced composite material were prepared by the same procedure as Comparative Example A203, and the arithmetic average roughness Ra and the bending strength were measured. Results are shown in Table 6. The epoxy resin composition immediately after preparation worked properly in impregnating carbon fibers in the SMC preparation step. The resin after conversion into the B stage was low in the viscosity at 30° C., and resin was found to be attached on the film surfaces when the films were removed from the SMC, leading to a low SMC handleability. Furthermore, results on the viscosity at 120° C. of the resin and the A/B ratio showed a particularly good flowability in the SMC hot press molding step. The cured resin had a Tg of 148° C., and the fiber reinforced composite material also had a favorable heat resistance, surface quality, and mechanical properties.

Comparative Example A205

Except for using a different compound for component (D) and mixing components (C) and (D) in the proportion given in Table 6, the same procedure as in Comparative Example A203 was carried out to prepare an epoxy resin composition, and the viscosity at 70° C. immediately after preparation was measured. Then, the aforementioned epoxy resin composition was converted into the B stage by maintaining it at 40° C. for 24 hours, and the viscosity at 30° C. and 120° C. was measured. A SMC and a fiber reinforced composite material were prepared by the same procedure as Comparative Example A203, and the arithmetic average roughness Ra and the bending strength were measured. Results are shown in Table 6. The epoxy resin composition immediately after preparation worked properly in impregnating carbon fibers in the SMC preparation step. The handleability of the SMC was high as seen from the viscosity of the resin at 30° C. after conversion into the B stage. On the other hand, results on the viscosity at 120° C. of the resin showed a poor flowability in the SMC hot press molding step. The cured resin had a Tg of 90° C., and the fiber reinforced composite material was poor in all of heat resistance, surface quality, and mechanical properties.

Comparative Example A206

Except for using a different compound for component (D) and mixing components (B) to (D) in the proportion given in Table 6, the same procedure as in Comparative Example A203 was carried out to prepare an epoxy resin composition, and the viscosity at 70° C. immediately after preparation was measured. Then, the aforementioned epoxy resin composition was converted into the B stage by maintaining it at 40° C. for 24 hours, and the viscosity at 30° C. and 120° C. was measured. A SMC and a fiber reinforced composite material were prepared by the same procedure as Comparative Example A203, and the arithmetic average roughness Ra and the bending strength were measured. Results are shown in Table 6. The epoxy resin composition immediately after preparation worked properly in impregnating carbon fibers in the SMC preparation step. The handleability of the SMC at 30° C. after conversion into the B stage was high. Furthermore, results on the viscosity at 120° C. of the resin showed a poor flowability in the SMC hot press molding step. The cured resin had a Tg of 130° C., and the fiber reinforced composite material was poor in all of heat resistance, surface quality, and mechanical properties.

TABLE 1

|  |  |  | Example A101 | Example A102 | Example A103 | Example A104 | Example A105 |
|---|---|---|---|---|---|---|---|
| Epoxy resin composition | component (A) | YD128 | 80 | 80 | 80 | 80 | 80 |
|  |  | jER154 | 20 | 20 | 20 | 20 | 20 |
|  |  | jER1001 | — | — | — | — | — |

TABLE 1-continued

|  |  |  |  |  |  |  |  |
|---|---|---|---|---|---|---|---|
|  |  |  | jER1007 | — | — | — | — | — |
|  |  |  | YDF2001 | — | — | — | — | — |
|  |  |  | ERISYS GE-21 | — | — | — | — | — |
|  |  |  | ERISYS GE-22 | — | — | — | — | — |
|  |  |  | Denacol EX-211 | — | — | — | — | — |
|  |  |  | Denacol EX-212 | — | — | — | — | — |
|  |  |  | Denacol EX-313 | — | — | — | — | — |
|  |  | component (B) | DICY7 | 6.4 | 6.4 | 6.4 | 6.4 | 6.4 |
|  |  | component (C) | M20S | 35 | 25 | 15 | 35 | 35 |
|  |  |  | MI | — | — | — | — | — |
|  |  |  | phenyl isocyanate | — | — | — | — | — |
|  |  | component (D) | ethylene glycol | 6 | 3.7 | 1.4 | — | — |
|  |  |  | glycerin | — | — | — | 6 | — |
|  |  |  | diglycerol | — | — | — | — | 8 |
|  |  |  | Denacol EX-611 | — | — | — | — | — |
|  |  |  | PEG600 | — | — | — | — | — |
|  |  |  | jER1004 | — | — | — | — | — |
|  |  |  | 1-butanol | — | — | — | — | — |
|  |  | component (E) | tetrabutyl ammonium bromide | — | — | — | — | — |
|  |  |  | tetraphenyl phosphonium bromide | — | — | — | — | — |
|  |  |  | 2-methyl imidazole | — | — | — | — | — |
|  |  |  | triphenyl phosphine | — | — | — | — | — |
|  |  | component (F) | Omicure52 | — | — | — | — | — |
|  |  |  | DCMU99 | — | — | — | — | — |
| Resin properties | immediately after preparation | viscosity at 70° C. [mPa · s] |  | 300 | 330 | 360 | 270 | 400 |
|  | after conversion into B stage | viscosity at 120° C. [Pa · s] |  | 450 | 330 | 250 | 600 | 640 |
|  |  | A/B (A: viscosity at 70° C., B: viscosity at 130° C.) |  | 35 | 40 | 60 | 32 | 25 |
|  | after curing | glass transition temperature [° C.] |  | 143 | 143 | 140 | 145 | 144 |
| SMC | angle a and b [°] |  |  | 90 | 90 | 90 | 90 | 90 |
|  | bending strength at 150° C. [MPa] |  |  | 280 | 280 | 250 | 310 | 303 |

|  |  |  |  | Example A106 | Example A107 | Example A108 | Example A109 |
|---|---|---|---|---|---|---|---|
| Epoxy resin composition | component (A) | YD128 |  | 80 | 80 | 70 | 60 |
|  |  | jER154 |  | 20 | 20 | 30 | 40 |
|  |  | jER1001 |  | — | — | — | — |
|  |  | jER1007 |  | — | — | — | — |
|  |  | YDF2001 |  | — | — | — | — |
|  |  | ERISYS GE-21 |  | — | — | — | — |
|  |  | ERISYS GE-22 |  | — | — | — | — |
|  |  | Denacol EX-211 |  | — | — | — | — |
|  |  | Denacol EX-212 |  | — | — | — | — |
|  |  | Denacol EX-313 |  | — | — | — | — |
|  | component (B) | DICY7 |  | 6.4 | 6.4 | 6.5 | 6.5 |
|  | component (C) | M20S |  | — | — | 35 | 35 |
|  |  | MI |  | 35 | 35 | — | — |
|  |  | phenyl isocyanate |  | — | — | — | — |
|  | component (D) | ethylene glycol |  | — | — | — | — |
|  |  | glycerin |  | 6.7 | — | — | — |
|  |  | diglycerol |  | — | 9 | 8.4 | 8.7 |
|  |  | Denacol EX-611 |  | — | — | — | — |
|  |  | PEG600 |  | — | — | — | — |
|  |  | jER1004 |  | — | — | — | — |
|  |  | 1-butanol |  | — | — | — | — |
|  | component (E) | tetrabutyl ammonium bromide |  | — | — | — | — |
|  |  | tetraphenyl phosphonium bromide |  | — | — | — | — |
|  |  | 2-methyl imidazole |  | — | — | — | — |
|  |  | triphenyl phosphine |  | — | — | — | — |
|  | component (F) | Omicure52 |  | — | — | — | — |
|  |  | DCMU99 |  | — | — | — | — |
| Resin properties | immediately after preparation | viscosity at 70° C. [mPa · s] |  | 200 | 270 | 540 | 730 |
|  | after conversion into B stage | viscosity at 120° C. [Pa · s] |  | 470 | 770 | 820 | 820 |
|  |  | A/B (A: viscosity at 70° C., B: viscosity at 130° C.) |  | 55 | 52 | 37 | 39 |
|  | after curing | glass transition temperature [° C.] |  | 142 | 140 | 145 | 150 |
| SMC | angle a and b [°] |  |  | 90 | 90 | 90 | 90 |
|  | bending strength at 150° C. [MPa] |  |  | 253 | 250 | 310 | 320 |

TABLE 2

| | | | Example A110 | Example A111 | Example A112 | Example A113 | Example A114 | Example A115 |
|---|---|---|---|---|---|---|---|---|
| Epoxy resin composition | component (A) | YD128 | 60 | 60 | 60 | 60 | 60 | 60 |
| | | jER154 | 40 | 40 | 40 | 40 | 40 | 40 |
| | | jER1001 | — | — | — | — | — | — |
| | | jER1007 | — | — | — | — | — | — |
| | | YDF2001 | — | — | — | — | — | — |
| | | ERISYS GE-21 | — | — | — | — | — | — |
| | | ERISYS GE-22 | — | — | — | — | — | — |
| | | Denacol EX-211 | — | — | — | — | — | — |
| | | Denacol EX-212 | — | — | — | — | — | — |
| | | Denacol EX-313 | — | — | — | — | — | — |
| | component (B) | DICY7 | 6.5 | 6.5 | 6.5 | 6.5 | 6.5 | 6.5 |
| | component (C) | M20S | 35 | 35 | 35 | 35 | 35 | 35 |
| | | MI | — | — | — | — | — | — |
| | | phenyl isocyanate | — | — | — | — | — | — |
| | component (D) | ethylene glycol | — | — | — | — | — | — |
| | | glycerin | — | — | — | — | — | — |
| | | diglycerol | 8.7 | 8.7 | 8.7 | 8.7 | 8.7 | 8.7 |
| | | Denacol EX-611 | — | — | — | — | — | — |
| | | PEG600 | — | — | — | — | — | — |
| | | jER1004 | — | — | — | — | — | — |
| | | 1-butanol | — | — | — | — | — | — |
| | component (E) | tetrabutyl ammonium bromide | 3 | — | — | — | 3 | 3 |
| | | tetraphenyl phosphonium bromide | — | 3 | — | — | — | — |
| | | 2-methyl imidazole | — | — | 3 | — | — | — |
| | | triphenyl phosphine | — | — | — | 3 | — | — |
| | component (F) | Omicure52 | — | — | — | — | — | 3 |
| | | DCMU99 | — | — | — | — | 3 | — |
| Resin properties | immediately after preparation | viscosity at 70° C. [mPa · s] | 750 | 770 | 720 | 780 | 820 | 800 |
| | after conversion into B stage | viscosity at 120° C. [Pa · s] | 890 | 900 | 930 | 1000 | 1040 | 1130 |
| | | A/B (A: viscosity at 70° C., B: viscosity at 130° C.) | 14 | 13 | 16 | 14 | 11 | 12 |
| | after curing | glass transition temperature [° C.] | 155 | 153 | 154 | 155 | 157 | 158 |
| SMC | | angle a and b [°] | 90 | 90 | 90 | 90 | 90 | 90 |
| | | bending strength at 150° C. [MPa] | 330 | 320 | 328 | 330 | 350 | 353 |

TABLE 3

| | | | Example A201 | Example A202 | Example A203 | Example A204 | Example A205 |
|---|---|---|---|---|---|---|---|
| Epoxy resin composition | component (A) | YD128 | 80 | 40 | 80 | 80 | 80 |
| | | jER154 | 20 | 60 | 20 | 20 | 20 |
| | | jER1001 | — | — | — | — | — |
| | | jER1007 | — | — | — | — | — |
| | | YDF2001 | — | — | — | — | — |
| | | ERISYS GE-21 | — | — | — | — | — |
| | | ERISYS GE-22 | — | — | — | — | — |
| | | Denacol EX-211 | — | — | — | — | — |
| | | Denacol EX-212 | — | — | — | — | — |
| | | Denacol EX-313 | — | — | — | — | — |
| | component (B) | DICY7 | 6.4 | 6.6 | 6.4 | 6.4 | 8.6 |
| | component (C) | M20S | 35 | — | 35 | 35 | 25 |
| | | MI | — | 31 | — | — | — |
| | | phenyl isocyanate | — | — | — | — | — |
| | component (D) | ethylene glycol | 6 | 6.7 | — | — | — |
| | | glycerin | — | — | 6 | — | — |
| | | diglycerol | — | — | — | 8 | — |
| | | Denacol EX-611 | — | — | — | — | 30 |
| | | PEG600 | — | — | — | — | — |
| | | jER1004 | — | — | — | — | — |
| | | 1-butanol | — | — | — | — | — |
| | component (E) | tetrabutyl ammonium bromide | — | — | — | — | — |
| | | tetraphenyl phosphonium bromide | — | — | — | — | — |
| | | 2-methyl imidazole | — | — | — | — | — |
| | | triphenyl phosphine | — | — | — | — | — |
| | component (F) | Omicure52 | — | — | — | — | — |
| | | DCMU99 | — | — | — | — | — |

TABLE 3-continued

| | | | | | | | |
|---|---|---|---|---|---|---|---|
| Resin properties | immediately after preparation | viscosity at 70° C. [mPa · s] | 300 | 900 | 270 | 400 | 600 |
| | after conversion into B stage | viscosity at 30° C. [×10⁴ Pa · s] | 4 | 3.5 | 11 | 14 | 10 |
| | | viscosity at 120° C. [Pa · s] | 450 | 120 | 600 | 640 | 1200 |
| | | A/B (A: viscosity at 70° C., B: viscosity at 130° C.) | 35 | 78 | 32 | 25 | 15 |
| SMC | after curing | glass transition temperature [° C.] | 143 | 142 | 145 | 144 | 150 |
| | | angle a and b [°] | 12 | 12 | 12 | 12 | 12 |
| | after conversion into B stage | handleability at 30° C. | A | A | A | A | A |
| | after curing | arithmetic average roughness Ra [μm] | 0.3 | 0.4 | 0.25 | 0.25 | 0.15 |
| | | bending strength at 150° C. [MPa] | 310 | 280 | 330 | 320 | 350 |

| | | | Example A206 | Example A207 | Example A208 | Example A209 | Example A210 |
|---|---|---|---|---|---|---|---|
| Epoxy resin composition | component (A) | YD128 | 60 | 60 | 60 | 60 | 60 |
| | | jER154 | 40 | 40 | 40 | 40 | 40 |
| | | jER1001 | — | — | — | — | — |
| | | jER1007 | — | — | — | — | — |
| | | YDF2001 | — | — | — | — | — |
| | | ERISYS GE-21 | — | — | — | — | — |
| | | ERISYS GE-22 | — | — | — | — | — |
| | | Denacol EX-211 | — | — | — | — | — |
| | | Denacol EX-212 | — | — | — | — | — |
| | | Denacol EX-313 | — | — | — | — | — |
| | component (B) | DICY7 | 6.5 | 6.5 | 6.5 | 6.5 | 6.5 |
| | component (C) | M20S | 35 | 35 | 35 | 35 | 35 |
| | | MI | — | — | — | — | — |
| | | phenyl isocyanate | — | — | — | — | — |
| | component (D) | ethylene glycol | — | — | — | — | — |
| | | glycerin | — | — | — | — | — |
| | | diglycerol | 8.7 | 8.7 | 8.7 | 8.7 | 8.7 |
| | | Denacol EX-611 | — | — | — | — | — |
| | | PEG600 | — | — | — | — | — |
| | | jER1004 | — | — | — | — | — |
| | | 1-butanol | — | — | — | — | — |
| | component (E) | tetrabutyl ammonium bromide | 3 | — | 3 | 3 | 3 |
| | | tetraphenyl phosphonium bromide | — | — | — | — | — |
| | | 2-methyl imidazole | — | — | — | — | — |
| | | triphenyl phosphine | — | 3 | — | — | — |
| | component (F) | Omicure52 | — | — | 3 | — | — |
| | | DCMU99 | — | — | — | — | — |
| Resin properties | immediately after preparation | viscosity at 70° C. [mPa · s] | 750 | 780 | 800 | 750 | 750 |
| | after conversion into B stage | viscosity at 30° C. [×10⁴ Pa · s] | 15 | 16 | 17 | 15 | 15 |
| | | viscosity at 120° C. [Pa · s] | 890 | 1000 | 1130 | 890 | 890 |
| | | A/B (A: viscosity at 70° C., B: viscosity at 130° C.) | 14 | 14 | 12 | 14 | 14 |
| SMC | after curing | glass transition temperature [° C.] | 155 | 155 | 158 | 155 | 155 |
| | | angle a and b [°] | 12 | 12 | 12 | 2 | 30 |
| | after conversion into B stage | handleability at 30° C. | A | A | A | A | A |
| | after curing | arithmetic average roughness Ra [μm] | 0.2 | 0.2 | 0.15 | 0.35 | 0.35 |
| | | bending strength at 150° C. [MPa] | 370 | 370 | 390 | 350 | 340 |

TABLE 4

| | | | Example A211 | Example A212 | Example A213 | Example A214 | Example A215 | Example A216 | Example A217 | Example A218 |
|---|---|---|---|---|---|---|---|---|---|---|
| Epoxy resin composition | component (A) | YD128 | 75 | 75 | 75 | 77 | 79 | 40 | 40 | 40 |
| | | jER154 | 20 | 20 | 20 | 20 | 20 | 50 | 50 | 50 |
| | | jER1001 | 5 | — | — | — | — | — | — | — |
| | | jER1007 | — | 5 | — | 3 | 1 | — | — | — |
| | | YDF2001 | — | — | 5 | — | — | — | — | — |
| | | ERISYS GE-21 | — | — | — | — | — | 10 | — | — |
| | | ERISYS GE-22 | — | — | — | — | — | — | 10 | — |
| | | Denacol EX-211 | — | — | — | — | — | — | — | 10 |
| | | Denacol EX-212 | — | — | — | — | — | — | — | — |
| | | Denacol EX-313 | — | — | — | — | — | — | — | — |

TABLE 4-continued

|  |  |  |  |  |  |  |  |  |  |
|---|---|---|---|---|---|---|---|---|---|
|  | component (B) | DICY7 | 6.2 | 6.1 | 6.2 | 6.3 | 6.4 | 6.9 | 6.7 | 6.8 |
|  | component (C) | M20S | 25 | 25 | 25 | 25 | 25 | 25 | 25 | 25 |
|  |  | MI | — | — | — | — | — | — | — | — |
|  |  | phenyl isocyanate | — | — | — | — | — | — | — | — |
|  | component (D) | ethylene glycol | 3.8 | 3.8 | 3.8 | 4 | 4.1 | 5.2 | 5.2 | 5.2 |
|  |  | glycerin | — | — | — | — | — | — | — | — |
|  |  | diglycerol | — | — | — | — | — | — | — | — |
|  |  | Denacol EX-611 | — | — | — | — | — | — | — | — |
|  |  | PEG600 | — | — | — | — | — | — | — | — |
|  |  | jER1004 | — | — | — | — | — | — | — | — |
|  |  | 1-butanol | — | — | — | — | — | — | — | — |
|  | component (E) | tetrabutyl ammonium bromide | — | — | — | — | — | — | — | — |
|  |  | Tetraphenyl phosphonium bromide | — | — | — | — | — | — | — | — |
|  |  | 2-methyl imidazole | — | — | — | — | — | — | — | — |
|  |  | triphenyl phosphine | — | — | — | — | — | — | — | — |
|  | component (F) | Omicure52 | — | — | — | — | — | — | — | — |
|  |  | DCMU99 | — | — | — | — | — | — | — | — |
| Resin properties | immediately after preparation | viscosity at 70° C. [mPa · s] | 700 | 750 | 800 | 580 | 410 | 600 | 650 | 600 |
|  | after conversion into B stage | viscosity at 30° C. [×10⁴ Pa · s] | 17 | 22 | 14 | 15 | 8 | 20 | 18 | 20 |
|  |  | viscosity at 120° C. [Pa · s] | 650 | 560 | 550 | 470 | 380 | 400 | 450 | 400 |
|  |  | A/B (A: viscosity at 70° C., B: viscosity at 130° C.) | 20 | 25 | 30 | 31 | 37 | 40 | 38 | 40 |
|  | after curing | glass transition temperature [° C.] | 143 | 143 | 143 | 143 | 143 | 145 | 147 | 146 |
| SMC | after conversion into B stage | angle a and b [°] | 12 | 12 | 12 | 12 | 12 | 12 | 12 | 12 |
|  |  | handleability at 30° C. | A | A | A | A | A | A | A | A |
|  | after curing | arithmetic average roughness Ra [μm] | 0.2 | 0.2 | 0.25 | 0.25 | 0.3 | 0.3 | 0.3 | 0.3 |
|  |  | bending strength at 150° C. [MPa] | 330 | 320 | 300 | 320 | 310 | 370 | 380 | 375 |

|  |  |  | Example A219 | Example A220 | Example A221 | Example A222 | Example A223 | Example A224 | Example A225 | Example A226 |
|---|---|---|---|---|---|---|---|---|---|---|
| Epoxy resin composition | component (A) | YD128 | 40 | 40 | 77 | 65 | 65 | 65 | 77 | 77 |
|  |  | jER154 | 50 | 50 | 20 | 20 | 20 | 20 | 20 | 20 |
|  |  | jER1001 | — | — | — | — | — | — | — | — |
|  |  | jER1007 | — | — | 3 | 5 | 5 | 5 | 3 | 3 |
|  |  | YDF2001 | — | — | — | — | — | — | — | — |
|  |  | ERISYS GE-21 | — | — | — | — | — | — | — | — |
|  |  | ERISYS GE-22 | — | — | — | 10 | — | — | — | — |
|  |  | Denacol EX-211 | — | — | — | — | 10 | — | — | — |
|  |  | Denacol EX-212 | 10 | — | — | — | — | — | — | — |
|  |  | Denacol EX-313 | — | 10 | — | — | — | 10 | — | — |
|  | component (B) | DICY7 | 6.7 | 6.8 | 6.3 | 6.5 | 6.4 | 6.4 | 6.3 | 6.3 |
|  | component (C) | M20S | 25 | 25 | 25 | 25 | 25 | 25 | 25 | 25 |
|  |  | MI | — | — | — | — | — | — | — | — |
|  |  | phenyl isocyanate | — | — | — | — | — | — | — | — |
|  | component (D) | ethylene glycol | 5.2 | 4.1 | — | — | — | — | — | — |
|  |  | glycerin | — | — | — | — | — | — | — | — |
|  |  | diglycerol | — | — | 5.3 | 5.4 | 5.4 | 3.9 | 5.3 | 5.3 |
|  |  | Denacol EX-611 | — | — | — | — | — | — | — | — |
|  |  | PEG600 | — | — | — | — | — | — | — | — |
|  |  | jER1004 | — | — | — | — | — | — | — | — |
|  |  | 1-butanol | — | — | — | — | — | — | — | — |
|  | component (E) | tetrabutyl ammonium bromide | — | — | — | — | — | — | 3 | — |
|  |  | Tetraphenyl phosphonium bromide | — | — | — | — | — | — | — | — |
|  |  | 2-methyl imidazole | — | — | — | — | — | — | — | — |
|  |  | triphenyl phosphine | — | — | — | — | — | — | — | 3 |
|  | component (F) | Omicure52 | — | — | — | — | — | — | 3 | — |
|  |  | DCMU99 | — | — | — | — | — | — | — | — |
| Resin properties | immediately after preparation | viscosity at 70° C. [mPa · s] | 610 | 750 | 620 | 500 | 510 | 550 | 690 | 670 |
|  | after conversion into B stage | viscosity at 30° C. [×10⁴ Pa · s] | 19 | 24 | 25 | 17 | 17 | 18 | 27 | 26 |
|  |  | viscosity at 120° C. | 410 | 600 | 680 | 500 | 500 | 650 | 980 | 890 |

TABLE 4-continued

|   |   |   |   |   |   |   |   |   |   |   |
|---|---|---|---|---|---|---|---|---|---|---|
|   |   | [Pa·s] |   |   |   |   |   |   |   |   |
|   |   | A/B (A: viscosity at 70° C., B: viscosity at 130° C.) | 40 | 23 | 21 | 25 | 25 | 13 | 12 | 14 |
|   | after curing | glass transition temperature [° C.] | 144 | 150 | 144 | 140 | 140 | 143 | 144 | 144 |
| SMC | angle a and b [°] |   | 12 | 12 | 12 | 12 | 12 | 12 | 12 | 12 |
|   | after conversion into B stage | handleability at 30° C. | A | A | A | A | A | A | A | A |
|   | after curing | arithmetic average roughness Ra [μm] | 0.3 | 0.2 | 0.2 | 0.2 | 0.2 | 0.15 | 0.2 | 0.2 |
|   |   | bending strength at 150° C. [MPa] | 360 | 390 | 320 | 310 | 310 | 340 | 330 | 330 |

TABLE 5

|   |   |   | Comparative Example A101 | Comparative Example A102 | Comparative Example A103 | Comparative Example A104 |
|---|---|---|---|---|---|---|
| Epoxy resin composition | component (A) | YD128 | 60 | 60 | 60 | 60 |
|   |   | jER154 | 40 | 40 | 40 | 40 |
|   |   | jER1001 | — | — | — | — |
|   |   | jER1007 | — | — | — | — |
|   |   | YDF2001 | — | — | — | — |
|   |   | ERISYS GE-21 | — | — | — | — |
|   |   | ERISYS GE-22 | — | — | — | — |
|   |   | Denacol EX-211 | — | — | — | — |
|   |   | Denacol EX-212 | — | — | — | — |
|   |   | Denacol EX-313 | — | — | — | — |
|   | component (B) | DICY7 | 6.5 | 6.5 | 6.6 | 6.7 |
|   | component (C) | M20S | — | 15 | — | 15 |
|   |   | MI | 35 | — | 15 | — |
|   |   | phenyl isocyanate | — | — | — | — |
|   | component (D) | ethylene glycol | 6.7 | — | — | — |
|   |   | glycerin | — | — | — | — |
|   |   | diglycerol | — | — | — | — |
|   |   | Denacol EX-611 | — | — | — | — |
|   |   | PEG600 | — | 19 | — | — |
|   |   | jER1004 | — | — | 16 | 19 |
|   |   | 1-butanol | — | — | — | — |
|   | component (E) | tetrabutyl ammonium bromide | — | — | — | — |
|   |   | tetraphenyl phosphonium bromide | — | — | — | — |
|   |   | 2-methyl imidazole | — | — | — | — |
|   |   | triphenyl phosphine | — | — | — | — |
|   | component (F) | Omicure52 | — | — | — | — |
|   |   | DCMU99 | — | — | — | — |
| Resin properties | immediately after preparation | viscosity at 70° C. [mPa·s] | 500 | 800 | 2500 | 2300 |
|   | after conversion into B stage | viscosity at 120° C. [Pa·s] | 20 | 900 | 50 | 80 |
|   |   | A/B (A: viscosity at 70° C., B: viscosity at 130° C.) | 1700 | 40 | 600 | 580 |
|   | after curing | glass transition temperature [° C.] | 140 | 100 | 140 | 145 |
| SMC | angle a and b [°] |   | 90 | 90 | 90 | 90 |
|   | bending strength at 150° C. [MPa] |   | 240 | 190 | 240 | 245 |

|   |   |   | Comparative Example A105 | Comparative Example A106 | Comparative Example A107 | Comparative Example A108 |
|---|---|---|---|---|---|---|
| Epoxy resin composition | component (A) | YD128 | 60 | 60 | 60 | 60 |
|   |   | jER154 | 40 | 40 | 40 | 40 |
|   |   | jER1001 | — | — | — | — |
|   |   | jER1007 | — | — | — | — |
|   |   | YDF2001 | — | — | — | — |
|   |   | ERISYS GE-21 | — | — | — | — |
|   |   | ERISYS GE-22 | — | — | — | — |
|   |   | Denacol EX-211 | — | — | — | — |
|   |   | Denacol EX-212 | — | — | — | — |
|   |   | Denacol EX-313 | — | — | — | — |
|   | component (B) | DICY7 | 6.5 | 6.5 | 6.5 | 6.5 |
|   | component (C) | M20S | — | — | 30 | — |
|   |   | MI | — | — | — | — |
|   |   | phenyl isocyanate | — | 30 | — | 30 |

TABLE 5-continued

|  |  |  |  |  |  |  |
|---|---|---|---|---|---|---|
|  | component (D) | ethylene glycol | — | — | — | — |
|  |  | glycerin | — | — | — | — |
|  |  | diglycerol | — | — | — | — |
|  |  | Denacol EX-611 | — | — | — | — |
|  |  | PEG600 | — | — | — | — |
|  |  | jER1004 | — | — | — | — |
|  |  | 1-butanol | — | — | 14.2 | 15.1 |
|  | component (E) | tetrabutyl ammonium bromide | — | — | — | — |
|  |  | tetraphenyl phosphonium bromide | — | — | — | — |
|  |  | 2-methyl imidazole | — | — | — | — |
|  |  | triphenyl phosphine | — | — | — | — |
|  | component (F) | Omicure52 | — | — | — | — |
|  |  | DCMU99 | — | — | — | — |
| Resin properties | immediately after preparation | viscosity at 70° C. [mPa · s] | 300 | 200 | 400 | 440 |
|  | after conversion into B stage | viscosity at 120° C. [Pa · s] | 0.1 | 0.05 | 0.08 | 0.09 |
|  |  | A/B (A: viscosity at 70° C., B: viscosity at 130° C.) | 120 | 140 | 200 | 160 |
|  | after curing | glass transition temperature [° C.] | 140 | 134 | 130 | 127 |
| SMC | angle a and b [°] |  | 90 | 90 | 90 | 90 |
|  | bending strength at 150° C. [MPa] |  | 240 | 223 | 210 | 200 |

TABLE 6

|  |  |  | Comparative Example A201 | Comparative Example A202 | Comparative Example A203 | Comparative Example A204 | Comparative Example A205 | Comparative Example A206 |
|---|---|---|---|---|---|---|---|---|
| Epoxy resin composition | component (A) | YD128 | 40 | 40 | 60 | 40 | 60 | 60 |
|  |  | jER154 | 60 | 60 | 40 | 60 | 40 | 40 |
|  |  | jER1001 | — | — | — | — | — | — |
|  |  | jER1007 | — | — | — | — | — | — |
|  |  | YDF2001 | — | — | — | — | — | — |
|  |  | ERISYS GE-21 | — | — | — | — | — | — |
|  |  | ERISYS GE-22 | — | — | — | — | — | — |
|  |  | Denacol EX-211 | — | — | — | — | — | — |
|  |  | Denacol EX-212 | — | — | — | — | — | — |
|  |  | Denacol EX-313 | — | — | — | — | — | — |
|  | component (B) | DICY7 | 6.4 | 6.4 | 6.5 | 6.4 | 6.5 | 6.5 |
|  | component (C) | M20S | — | — | 55 | — | 35 | 30 |
|  |  | MI | 31 | 31 | — | — | — | — |
|  |  | phenyl isocyanate | — | — | — | — | — | — |
|  | component (D) | ethylene glycol | 6.7 | 6.7 | — | — | — | — |
|  |  | glycerin | — | — | — | — | — | — |
|  |  | diglycerol | — | — | 14.8 | — | — | — |
|  |  | Denacol EX-611 | — | — | — | — | — | — |
|  |  | PEG600 | — | — | — | — | 45 | — |
|  |  | jER1004 | — | — | — | — | — | — |
|  |  | 1-butanol | — | — | — | — | — | 14.2 |
|  | component (E) | tetrabutyl ammonium bromide | — | — | — | — | — | — |
|  |  | tetraphenyl phosphonium bromide | — | — | — | — | — | — |
|  |  | 2-methyl imidazole | — | — | — | — | — | — |
|  |  | triphenyl phosphine | — | — | — | — | — | — |
|  | component (F) | Omicure52 | — | — | — | — | — | — |
|  |  | DCMU99 | — | — | — | — | — | — |
| Resin properties | immediately after preparation | viscosity at 70° C. [mPa · s] | 900 | 900 | 500 | 950 | 1000 | 400 |
|  | after conversion into B stage | viscosity at 30° C. [×10⁴ Pa · s] | 3.5 | 3.5 | 110 | 1 | 50 | 5 |
|  |  | viscosity at 120° C. [Pa · s] | 120 | 120 | 4500 | 100 | 7000 | 0.08 |
|  |  | A/B (A: viscosity at 70° C., B: viscosity at 130° C.) | 78 | 78 | 40 | 100 | 40 | 200 |
|  | after curing | glass transition temperature [° C.] | 142 | 142 | 155 | 148 | 90 | 130 |
| SMC | angle a and b [°] |  | 1 | 40 | 12 | 12 | 12 | 12 |
|  | after conversion into B stage | handleability at 30° C. | A | A | B | B | A | A |
|  | after curing | arithmetic average roughness Ra [μm] | 0.5 | 0.6 | 0.3 | 0.25 | 0.7 | 0.6 |
|  |  | bending strength at 150° C. [MPa] | 240 | 220 | 330 | 300 | 170 | 220 |

TABLE 7

| | | | Example B01 | Example B02 | Example B03 | Example B04 | Example B05 |
|---|---|---|---|---|---|---|---|
| Epoxy resin composition | component (A) | YD128 | 80 | 80 | 80 | 80 | 80 |
| | | jER154 | 20 | 20 | 20 | 20 | 20 |
| | | jER1001 | — | — | — | — | — |
| | | jER1007 | — | — | — | — | — |
| | | YDF2001 | — | — | — | — | — |
| | | ERISYS GE-21 | — | — | — | — | — |
| | | ERISYS GE-22 | — | — | — | — | — |
| | | Denacol EX-211 | — | — | — | — | — |
| | | Denacol EX-212 | — | — | — | — | — |
| | | Denacol EX-313 | — | — | — | — | — |
| | component (B) | DICY7 | 6.4 | 6.4 | 6.4 | 6.4 | 6.4 |
| | component (C) | M20S | 35 | 25 | 15 | 35 | 35 |
| | | MI | — | — | — | — | — |
| | | phenyl isocyanate | — | — | — | — | — |
| | component (D) | ethylene glycol | 6 | 3.7 | 1.4 | — | — |
| | | glycerin | — | — | — | 6 | — |
| | | diglycerol | — | — | — | — | 8 |
| | | Denacol EX-611 | — | — | — | — | — |
| | | PEG600 | — | — | — | — | — |
| | | jER1004 | — | — | — | — | — |
| | | 1-butanol | — | — | — | — | — |
| | component (E) | tetrabutyl ammonium bromide | — | — | — | — | — |
| | | tetraphenyl phosphonium bromide | — | — | — | — | — |
| | | 2-methyl imidazole | — | — | — | — | — |
| | | triphenyl phosphine | — | — | — | — | — |
| | component (F) | Omicure52 | — | — | — | — | — |
| | | DCMU99 | — | — | — | — | — |
| Resin properties | immediately after preparation | viscosity at 70° C. [mPa·s] | 300 | 330 | 360 | 270 | 400 |
| | after conversion into B stage | viscosity at 120° C. [Pa·s] | 450 | 330 | 250 | 600 | 640 |
| | | A/B (A: viscosity at 70° C., B: viscosity at 130° C.) | 35 | 40 | 60 | 32 | 25 |
| | after curing | glass transition temperature [° C.] | 143 | 143 | 140 | 145 | 144 |
| Prepreg | surface quality | | A | A | A | A | A |

| | | | Example B06 | Example B07 | Example B08 | Example B09 |
|---|---|---|---|---|---|---|
| Epoxy resin composition | component (A) | YD128 | 80 | 80 | 70 | 60 |
| | | jER154 | 20 | 20 | 30 | 40 |
| | | jER1001 | — | — | — | — |
| | | jER1007 | — | — | — | — |
| | | YDF2001 | — | — | — | — |
| | | ERISYS GE-21 | — | — | — | — |
| | | ERISYS GE-22 | — | — | — | — |
| | | Denacol EX-211 | — | — | — | — |
| | | Denacol EX-212 | — | — | — | — |
| | | Denacol EX-313 | — | — | — | — |
| | component (B) | DICY7 | 6.4 | 6.4 | 6.5 | 6.5 |
| | component (C) | M20S | — | — | 35 | 35 |
| | | MI | 35 | 35 | — | — |
| | | phenyl isocyanate | — | — | — | — |
| | component (D) | ethylene glycol | — | — | — | — |
| | | glycerin | 6.7 | — | — | — |
| | | diglycerol | — | 9 | 8.4 | 8.7 |
| | | Denacol EX-611 | — | — | — | — |
| | | PEG600 | — | — | — | — |
| | | jER1004 | — | — | — | — |
| | | 1-butanol | — | — | — | — |
| | component (E) | tetrabutyl ammonium bromide | — | — | — | — |
| | | tetraphenyl phosphonium bromide | — | — | — | — |
| | | 2-methyl imidazole | — | — | — | — |
| | | triphenyl phosphine | — | — | — | — |
| | component (F) | Omicure52 | — | — | — | — |
| | | DCMU99 | — | — | — | — |
| Resin properties | immediately after preparation | viscosity at 70° C. [mPa·s] | 200 | 270 | 540 | 730 |
| | after conversion into B stage | viscosity at 120° C. [Pa·s] | 470 | 770 | 820 | 820 |
| | | A/B (A: viscosity at 70° C., B: viscosity at 130° C.) | 55 | 52 | 37 | 39 |
| | after curing | glass transition temperature [° C.] | 142 | 140 | 145 | 150 |
| Prepreg | surface quality | | A | A | A | A |

TABLE 8

| | | | Example B10 | Example B11 | Example B12 | Example B13 | Example B14 | Example B15 | Example B16 |
|---|---|---|---|---|---|---|---|---|---|
| Epoxy resin composition | component (A) | YD128 | 60 | 60 | 60 | 60 | 60 | 60 | 60 |
| | | jER154 | 40 | 40 | 40 | 40 | 40 | 40 | 40 |
| | | jER1001 | — | — | — | — | — | — | — |
| | | jER1007 | — | — | — | — | — | — | — |
| | | YDF2001 | — | — | — | — | — | — | — |
| | | ERISYS GE-21 | — | — | — | — | — | — | — |
| | | ERISYS GE-22 | — | — | — | — | — | — | — |
| | | Denacol EX-211 | — | — | — | — | — | — | — |
| | | Denacol EX-212 | — | — | — | — | — | — | — |
| | | Denacol EX-313 | — | — | — | — | — | — | — |
| | component (B) | DICY7 | 6.5 | 6.5 | 6.5 | 6.5 | 6.5 | 6.5 | 6.5 |
| | component (C) | M20S | 35 | 35 | 35 | 35 | 35 | 35 | — |
| | | MI | — | — | — | — | — | — | 35 |
| | | phenyl isocyanate | — | — | — | — | — | — | — |
| | component (D) | ethylene glycol | — | — | — | — | — | — | 6.7 |
| | | glycerin | — | — | — | — | — | — | — |
| | | diglycerol | 8.7 | 8.7 | 8.7 | 8.7 | 8.7 | 8.7 | — |
| | | Denacol EX-611 | — | — | — | — | — | — | — |
| | | PEG600 | — | — | — | — | — | — | — |
| | | jER1004 | — | — | — | — | — | — | — |
| | | 1-butanol | — | — | — | — | — | — | — |
| | component (E) | tetrabutyl ammonium bromide | 3 | — | — | — | 3 | 3 | — |
| | | tetraphenyl phosphonium bromide | — | 3 | — | — | — | — | — |
| | | 2-methyl imidazole | — | — | 3 | — | — | — | — |
| | | triphenyl phosphine | — | — | — | 3 | — | — | — |
| | component (F) | Omicure52 | — | — | — | — | — | 3 | — |
| | | DCMU99 | — | — | — | — | 3 | — | — |
| Resin properties | immediately after preparation | viscosity at 70° C. [mPa · s] | 750 | 770 | 720 | 780 | 820 | 800 | 500 |
| | after conversion into B stage | viscosity at 120° C. [Pa · s] | 890 | 900 | 930 | 1000 | 1040 | 1130 | 20 |
| | | A/B (A: viscosity at 70° C., B: viscosity at 130° C.) | 14 | 13 | 16 | 14 | 11 | 12 | 1700 |
| | after curing | glass transition temperature [° C.] | 155 | 153 | 154 | 155 | 157 | 158 | 140 |
| Prepreg | surface quality | | A | A | A | A | A | A | A |

TABLE 9

| | | | Comparative Example B01 | Comparative Example B02 | Comparative Example B03 | Comparative Example B04 |
|---|---|---|---|---|---|---|
| Epoxy resin composition | component (A) | YD128 | 60 | 60 | 60 | 60 |
| | | jER154 | 40 | 40 | 40 | 40 |
| | | jER1001 | — | — | — | — |
| | | jER1007 | — | — | — | — |
| | | YDF2001 | — | — | — | — |
| | | ERISYS GE-21 | — | — | — | — |
| | | ERISYS GE-22 | — | — | — | — |
| | | Denacol EX-211 | — | — | — | — |
| | | Denacol EX-212 | — | — | — | — |
| | | Denacol EX-313 | — | — | — | — |
| | component (B) | DICY7 | 6.5 | 6.6 | 6.7 | 6.5 |
| | component (C) | M20S | 15 | — | 15 | — |
| | | MI | — | 15 | — | — |
| | | phenyl isocyanate | — | — | — | — |
| | component (D) | ethylene glycol | — | — | — | — |
| | | glycerin | — | — | — | — |
| | | diglycerol | — | — | — | — |
| | | Denacol EX-611 | — | — | — | — |
| | | PEG600 | 19 | — | — | — |
| | | jER1004 | — | 16 | 19 | — |
| | | 1-butanol | — | — | — | — |
| | component (E) | tetrabutyl ammonium bromide | — | — | — | — |
| | | tetraphenyl phosphonium bromide | — | — | — | — |
| | | 2-methyl imidazole | — | — | — | — |
| | | triphenyl phosphine | — | — | — | — |
| | component (F) | Omicure52 | — | — | — | — |
| | | DCMU99 | — | — | — | — |

TABLE 9-continued

| Resin properties | immediately after preparation | viscosity at 70° C. [mPa·s] | 800 | 2500 | 2300 | 300 |
|---|---|---|---|---|---|---|
| | after conversion into B stage | viscosity at 120° C. [Pa·s] | 900 | 50 | 80 | 0.1 |
| | | A/B (A: viscosity at 70° C., B: viscosity at 130° C.) | 40 | 600 | 580 | 120 |
| | after curing | glass transition temperature [° C.] | 100 | 140 | 145 | 140 |
| Prepreg | surface quality | | B | C | C | C |

| | | | Comparative Example B05 | Comparative Example B06 | Comparative Example B07 |
|---|---|---|---|---|---|
| Epoxy resin composition | component (A) | YD128 | 60 | 60 | 60 |
| | | jER154 | 40 | 40 | 40 |
| | | jER1001 | — | — | — |
| | | jER1007 | — | — | — |
| | | YDF2001 | — | — | — |
| | | ERISYS GE-21 | — | — | — |
| | | ERISYS GE-22 | — | — | — |
| | | Denacol EX-211 | — | — | — |
| | | Denacol EX-212 | — | — | — |
| | | Denacol EX-313 | — | — | — |
| | component (B) | DICY7 | 6.5 | 6.5 | 6.5 |
| | component (C) | M20S | — | 30 | — |
| | | MI | — | — | — |
| | | phenyl isocyanate | 30 | — | 30 |
| | component (D) | ethylene glycol | 6.3 | — | — |
| | | glycerin | — | — | — |
| | | diglycerol | — | — | — |
| | | Denacol EX-611 | — | — | — |
| | | PEG600 | — | — | — |
| | | jER1004 | — | — | — |
| | | 1-butanol | — | 14.2 | 15.1 |
| | component (E) | tetrabutyl ammonium bromide | — | — | — |
| | | tetraphenyl phosphonium bromide | — | — | — |
| | | 2-methyl imidazole | — | — | — |
| | | triphenyl phosphine | — | — | — |
| | component (F) | Omicure52 | — | — | — |
| | | DCMU99 | — | — | — |
| Resin properties | immediately after preparation | viscosity at 70° C. [mPa·s] | 200 | 400 | 440 |
| | after conversion into B stage | viscosity at 120° C. [Pa·s] | 0.05 | 0.08 | 0.09 |
| | | A/B (A: viscosity at 70° C., B: viscosity at 130° C.) | 140 | 200 | 160 |
| | after curing | glass transition temperature [° C.] | 134 | 130 | 127 |
| Prepreg | surface quality | | C | C | C |

INDUSTRIAL APPLICABILITY

As compared to the SMCs based on conventional epoxy resin compositions for SMC production, our SMC is superior since it shows good flow properties during a molding step to provide fiber reinforced composite materials having favorable heat resistance and strength properties. As compared to the prepregs based on conventional epoxy resin compositions for SMC production, furthermore, our prepreg is superior since it suffers little resin flow to provide fiber reinforced composite materials having high surface quality. Accordingly, it is expected that fiber reinforced composite materials will be in increasingly wider use in the fields of sports goods, industrial materials, aerospace/spacecraft, and automobiles and serve for reduction in consumptions of energy resources including fossil fuel, thus making contributions to solution of global warming problems.

The invention claimed is:

1. A sheet molding compound comprising an epoxy resin composition having the components (A) to (D) blended with carbon fibers:
   component (A): an epoxy resin,
   component (B): a curing agent,
   component (C): a polyisocyanate compound, and
   component (D): a polyol compound having a hydroxy group equivalent weight of 20 or more and 120 or less, and meets either or both of 1) and 2):
   1) component (C) contains a compound having 3 or more and 6 or less isocyanate groups in one molecule, and
   2) component (D) contains a compound having 3 or more and 6 or less hydroxy groups in one molecule, and
   the epoxy resin composition has a viscosity at 120° C. of $1.0 \times 10^2$ Pa·s or more and $1.0 \times 10^5$ Pa·s or less.

2. The sheet molding compound as set forth in claim 1, wherein both 1) and 2) are satisfied.

3. The sheet molding compound as set forth in claim 1, wherein component (D) is an aliphatic alcohol compound or an alicyclic alcohol compound.

4. The sheet molding compound as set forth in claim 1, wherein component (D) is an aliphatic alcohol compound.

5. The sheet molding compound as set forth in claim 1, wherein component (C) is an aromatic isocyanate compound.

6. The sheet molding compound as set forth in claim 1, wherein component (C) is a diphenyl methane diisocyanate derivative.

7. The sheet molding compound as set forth in claim 1, wherein the epoxy resin composition further comprises a component (E):
   component (E): at least one compound selected from the group consisting of quaternary ammonium salts, phosphonium salts, imidazole compounds, and phosphine compounds.

8. The sheet molding compound as set forth in claim 1, wherein the epoxy resin composition further comprises a component (F):
   component (F): a urea compound as represented by formula (1):

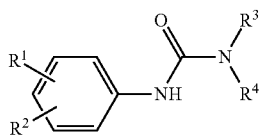
(1)

wherein $R^1$ and $R^2$ are each independently H, $CH_3$, $OCH_3$, $OC_2H_5$, $NO_2$, halogen, NH—CO—$NR^3R^4$ or Ph-NH—CO—$NR^3R^4$; and $R^3$ and $R^4$ are each independently a hydrocarbon group, allyl group, alkoxy group, alkenyl group, or aralkyl group, all containing 1 to 8 carbon atoms.

9. The sheet molding compound as set forth in claim 1, wherein component (A) is a bisphenol epoxy resin.

10. The sheet molding compound as set forth in claim 1, wherein component (B) is dicyandiamide or a derivative thereof.

11. A fiber reinforced composite material produced by curing a sheet molding compound as set forth in claim 1.

12. A sheet molding compound comprising an epoxy resin composition having the components (A) to (D) blended with carbon fibers:
   component (A): an epoxy resin,
   component (B): a curing agent,
   component (C): a polyisocyanate compound, and
   component (D): a polyol compound,
   the carbon fibers are in the form of bundle-shaped aggregates of discontinuous carbon fibers,
   the bundle-shaped aggregates are such that in a plane that has a largest width perpendicular to an alignment direction of the carbon fibers, two acute angles, referred to as angle a and angle b, formed between the alignment direction of the carbon fibers and sides formed by arrays of both ends of the carbon fibers in the bundle-shaped aggregates are 2° or more and 30° or less,
   the epoxy resin composition has a viscosity at 30° C. of $3.0 \times 10^4$ Pa·s or more and $1.0 \times 10^6$ Pa·s or less, and
   the epoxy resin composition has a viscosity at 120° C. of $1.0 \times 10^2$ Pa·s or more and $2.0 \times 10^3$ Pa·s or less.

13. A sheet molding compound comprising an epoxy resin composition having the components (A) to (D) blended with carbon fibers and meeting (I) and/or (II):
   component (A): an epoxy resin,
   component (B): a curing agent,
   component (C): a polyisocyanate compound, and
   component (D): a polyol compound,
   (I)
   component (D) has a hydroxy group equivalent weight of 20 or more and 120 or less, and meets either or both of 1) and 2):
      1) component (C) contains a compound having 3 or more and 6 or less isocyanate groups in one molecule, and
      2) component (D) contains a compound having 3 or more and 6 or less hydroxy groups in one molecule,
   (II)
   the carbon fibers are in the form of bundle-shaped aggregates of discontinuous carbon fibers,
   the bundle-shaped aggregates are such that in a plane that has a largest width perpendicular to an alignment direction of the carbon fibers, two acute angles, referred to as angle a and angle b, formed between the alignment direction of the carbon fibers and sides formed by arrays of both ends of the carbon fibers in the bundle-shaped aggregates are 2° or more and 30° or less,
   the epoxy resin composition has a viscosity at 30° C. of $3.0 \times 10^4$ Pa·s or more and $1.0 \times 10^6$ Pa·s or less, and
   the epoxy resin composition has a viscosity at 120° C. of $1.0 \times 10^2$ Pa·s or more and $5.0 \times 10^3$ Pa·s or less,
   wherein the epoxy resin composition contained in the sheet molding compound satisfies:

$1 \leq A/B \leq 100$ wherein A is viscosity at 70° C. and B is viscosity at 130° C.

14. A prepreg comprising an epoxy resin composition having components (A) to (D) impregnated into reinforcing fibers, the component (D) having a hydroxy group equivalent weight of 20 or more and 120 or less:
   component (A): an epoxy resin,
   component (B): a curing agent,
   component (C): a polyisocyanate compound, and
   component (D): a polyol compound,
   wherein the epoxy resin composition has a viscosity at 120° C. of 10 Pa·s or more and $1.0 \times 10^5$ Pa·s or less.

15. A prepreg comprising an epoxy resin composition having components (A) to (D) impregnated into reinforcing fibers, the component (D) having a hydroxy group equivalent weight of 20 or more and 120 or less:
   component (A): an epoxy resin,
   component (B): a curing agent,
   component (C): a polyisocyanate compound, and
   component (D): a polyol compound,
   wherein the epoxy resin composition satisfies:

$1 \leq A/B \leq 2{,}000$ wherein A is viscosity at 70° C. and B is viscosity at 130° C.

* * * * *